(12) United States Patent
Shishido et al.

(10) Patent No.: US 7,826,925 B2
(45) Date of Patent: Nov. 2, 2010

(54) LEGGED MOBILE ROBOT

(75) Inventors: Makoto Shishido, Wako (JP); Susumu Miyazaki, Wako (JP); Hiroyuki Kaneko, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1057 days.

(21) Appl. No.: 11/578,180

(22) PCT Filed: Feb. 18, 2005

(86) PCT No.: PCT/JP2005/002562

§ 371 (c)(1),
(2), (4) Date: Oct. 11, 2006

(87) PCT Pub. No.: WO2005/099970

PCT Pub. Date: Oct. 27, 2005

(65) Prior Publication Data

US 2007/0273320 A1    Nov. 29, 2007

(30) Foreign Application Priority Data

Apr. 12, 2004    (JP)    .............................. 2004-117190

(51) Int. Cl.
*G06F 19/00* (2006.01)
(52) U.S. Cl. ...................................... 700/245; 297/238
(58) Field of Classification Search ................ 700/245, 700/246, 247, 249, 250, 251, 253, 258, 260, 700/264; 318/568.1, 568.11, 568.12, 568.15, 318/568.16, 568.17, 568.2, 568.22, 568.25, 318/561, 580; 901/1, 2, 8, 9, 11, 23, 46, 901/47; 180/7.1, 8.1; 434/267; 297/238, 297/344.23; 701/25; 361/5, 23, 24
See application file for complete search history.

(56) References Cited

U.S. PATENT DOCUMENTS

| | | | | |
|---|---|---|---|---|
| 5,324,948 | A * | 6/1994 | Dudar et al. ................. | 250/379 |
| 6,064,167 | A | 5/2000 | Takenaka et al. | |
| 6,470,235 | B2 * | 10/2002 | Kasuga et al. ................ | 700/246 |
| 6,718,231 | B2 * | 4/2004 | Konno et al. ................. | 700/245 |
| 7,386,364 | B2 * | 6/2008 | Mikami et al. ................ | 700/245 |
| 2005/0055131 | A1 * | 3/2005 | Mikami et al. ............... | 700/245 |
| 2005/0113972 | A1 * | 5/2005 | Kumhyr ....................... | 700/245 |
| 2005/0283043 | A1 * | 12/2005 | Sisk ............................. | 600/38 |

FOREIGN PATENT DOCUMENTS

EP    1 110 853 A2    6/2001

(Continued)

OTHER PUBLICATIONS

Kinugasa et al., Sitting down and Standing up Motion of Sauro Emu with Manipulator Motions, 1998, IEEE, p. 1284-1289.*

(Continued)

*Primary Examiner*—Dalena Tran
(74) *Attorney, Agent, or Firm*—Squire, Sanders & Dempsey L.L.P.

(57) ABSTRACT

In a legged mobile robot having a body and legs connected to the body, a seating aid is provided at its body so as to enable to sit on a seat. With this, the space occupied by the robot can be decreased to reduce space during storage and transport, and also enhance safety in the course of transport. In addition, maintenance work is simplified because immobilization in the seated condition is possible. Still further, the range of works is expanded to enable deskwork and the like. Further, the seating aid is provided at a location that is rearward of a center of gravity of the robot when the robot is seated. With this, the moment acting on the robot about the center of gravity during seating does not operate to tilt the robot rearward and, therefore, the robot can be enabled to keep a stable posture from before to after sitting down.

10 Claims, 24 Drawing Sheets

FOREIGN PATENT DOCUMENTS

| | | |
|---|---|---|
| EP | 1 344 610 A1 | 9/2003 |
| JP | 2001-179663 | 7/2001 |
| JP | 2003-71753 | 3/2003 |
| JP | 2003-071754 | 3/2003 |
| JP | 2005-1099 | 1/2005 |

OTHER PUBLICATIONS

Hasunuma et al., A Tele operated Humanoid Robot Drives a Backhoe, 2003, IEEE, p. 2998-3004.*

Kinugasa et al., Attitude Control of Legged Robot Emu on Ramp with Unknown Slope, 2002, Internet, p. 2493-2498.*

Kinugasa et al., Standing Upright of Legged Robot Emu Using Constrained Ankle-Torque via Hybrid Control, 1999, IEEE, p. 1804-1809.*

Kondak et al., Control and Online Computation of Stable Movement for Biped Robots, 2003, IEEE, p. 874-879.*

European Search Report, PCT/JP2005002562 dated Apr. 21, 2008.

Robodex 2003 "ASIMO SDR-4XII", pp. 1-7, downloaded from http://pc.watch.impress.co.jp/docs/2003/0405/kyokai05.htm.

Robodex 2003, pp. 1-4, downloaded from http://pc.watch.impress.co.jp/docs/2003/0402/robodex.htm.

* cited by examiner

LEGGED MOBILE ROBOT

TECHNICAL FIELD

This invention relates to a legged mobile robot.

BACKGROUND ART

Although various biped, quadruped and other robots have been proposed as legged mobile robots in recent years, it has been proposed regarding the quadruped robot to provide a curved surface joining a flat surface formed on the rump-like region of the body and the belly-like region, shape the flat surface so that the body actively tilts toward the belly-like region under the robot's own weight with the curved surface being brought into contact with the ground, thereby enabling posture displacement to be performed naturally and more smoothly (see Patent Reference 1, for example).

Patent Reference 1: Japanese Laid-open Patent Application 2003-71753

DISCLOSURE OF THE INVENTION

Problems to be Solved by the Invention

Although the aforesaid prior art provides the curved surface on the rump-like region to allow posture displacement, including sitting, to be performed smoothly in a relatively small and light-weight pet robot, the ability also to enable other kinds of legged mobile robots, particularly biped humanoid robots and the like that emulate humans, to sit on a seat or the like would have advantages such as making it possible to reduce storage (parking) space, enhance safety in the course of transport, and, in addition, facilitate maintenance work.

However, these other kinds of legged mobile robots, particularly the biped humanoid robots and the like that emulate humans, are relatively large and heavy in dead weight, and since top priority from before to after sitting down is on maintaining stable posture, application of the prior art without modification is difficult.

The object of this invention is therefore to solve the aforesaid problem, to enable a relatively large legged mobile robot heavy in dead weight to assume a sitting posture, and to provide a legged mobile robot capable of keeping a stable posture from before to after sitting down.

Means for Solving the Problems

In order to achieve the object, as recited in claim 1 mentioned below, this invention is configured to have a legged mobile robot having at least a body and a leg linkage connected to the body through a joint and attached with a foot at its distal end, to be movable on a surface of floor by driving the leg linkage to bring the foot in contact with the floor surface, characterized in that: a seating aid is provided at least one of the body and the leg linkage so as to enable to sit on a seat; and the seating aid is provided at a location that is rearward of a center of gravity of the robot when the robot is seated.

Further, as recited in claim 2 mentioned below, this invention is configured to have a legged mobile robot having at least a body and a leg linkage connected to the body through a joint and attached with a foot at its distal end, to be movable on a surface of floor by driving the leg linkage to bring the foot in contact with the floor surface, characterized in that: a seating aid is provided at least one of the body and the leg linkage so as to enable to sit on a seat; and the seating aid is made displaceable relative to the seat.

Further, as recited in claim 3 mentioned below, this invention is configured to have a legged mobile robot having at least a body and a leg linkage connected to the body through a joint and attached with a foot at its distal end, to be movable on a surface of floor by driving the leg linkage to bring the foot in contact with the floor surface, characterized in that: a seating aid is provided at least one of the body and the leg linkage so as to enable to sit on a seat; and frictional force of the seating aid relative to the seat is made smaller than that of a ground contact surface of the foot relative to the floor surface.

Further, as recited in claim 4 mentioned below, this invention is configured to have a legged mobile robot having at least a body, a leg linkage swingably connected to the body through a hip joint and attached with a foot at its distal end, and an arm linkage swingably connected to the body through a shoulder joint and attached with a hand at its distal end, to work in a workspace by driving the arm linkage, characterized in that: a seating aid is provided at least one of the body and the leg linkage so as to enable to sit on a seat to work on objects in the workspace; a height to the shoulder joint from a ground contact surface of the foot when the robot is seated, is defined within a range determined based on an averaged value obtained by averaging heights of the objects from a surface of floor and deviations thereof, and the seating aid is provided at a location predetermined distance below the shoulder joint in a gravity direction.

Further, as recited in claim 5 mentioned below, this invention is configured such that the leg linkage has a thigh link and a shank link connected by a knee joint, and the seating aid is provided at a location within a range of $H\pm\{(\frac{1}{3})\cdot H\}$ from the ground contact surface of the foot, when the robot is seated, if a distance from the ground contact surface of the foot to the knee joint is defined as H.

Further, as recited in claim 6 mentioned below, this invention is configured such that a portion of the seating aid that contacts the seat comprises an elastic member.

Further, as recited in claim 7 mentioned below, this invention is configured such that a portion of the seating aid that contacts the seat comprises a rotating member.

Further, as recited in claim 8 mentioned below, this invention is configured such that a portion of the seating aid that contacts the seat comprises a rotating member fabricated from an elastic material.

Further, as recited in claim 9 mentioned below, this invention is configured such that the seating aid is provided with a terminal for charging a battery that powers an onboard equipment of the robot.

EFFECTS OF THE INVENTION

Since the legged mobile robot recited in claim 1 is configured such that a seating aid is provided at least one of the body and the leg linkage so as to enable to sit on a seat, the space occupied by the robot can be decreased to reduce space during storage (parking) and transport, and also enhance safety in the course of transport. In addition, maintenance work is simplified because immobilization in the seated condition is possible. Still further, the range of works is expanded to enable deskwork and the like. Further, it is configured such that the seating aid is provided at a location that is rearward of a center of gravity of the robot when the robot is seated, in other words, it is configured such that the seating aid is provided at a location in the direction opposite from the foot which receives the floor reaction force, whereby the moment acting on the robot about the center of gravity during seating does not operate to tilt the robot rearward and, therefore, the robot can be enabled to keep a stable posture from before to after sitting down.

Further, since the legged mobile robot recited in claim 2 is configured to enable sitting, it has the same effects as those mentioned above, and is further configured such that the seating aid is made displaceable relative to the seat, more specifically it is configured such that the body (upper body) is made displaceable (moveable back and forth) relative to the seat during sitting or during standing from the seated state, the center of gravity of the robot can be shifted or moved forward and, similarly, the moment acting on the robot about the center of gravity during seating can be prevented from operating to tilt the robot rearward. Moreover, even during standing from the seated state the aforesaid moment can be made to operate in the desired manner so that the robot can be enabled to keep a stable posture from before to after sitting down.

Further, since the legged mobile robot recited in claim 3 is configured to enable sitting, it has the same effects as those mentioned above, and is further configured such that frictional force of the seating aid relative to the seat is made smaller than that of a ground contact surface of the foot relative to the floor surface, in other words it is configured such that, when defining a frictional force as a product of a friction coefficient and a normal component of reaction, a value of the frictional force of the seating aid relative to the seat is made smaller than that of a ground contact surface of the foot relative to the floor surface, the moment about the center of gravity acting on the robot during seating can be made to operate in the desired manner, e.g., can be made to operate so as not to tilt the robot rearward, and the aforesaid moment can also be made to operate in the desired manner even during standing from the seated state, whereby the robot can be enabled to keep a stable posture from before to after sitting down.

Further, since the legged mobile robot recited in claim 4 is configured to enable to sit to work on objects in the workspace, it has the same effects as those mentioned above, in particular the effects that the range of works is expanded to enable desk work and the like. And since it is further configured such that a height to the shoulder joint from a ground contact surface of the foot when the robot is seated, is defined within a range determined based on an averaged value obtained by averaging heights of the objects from a surface of floor and deviations thereof, the height of the shoulder joints can be optimally determined in accordance with the heights of the objects to be worked when seated. Further, since it is configured such that the seating aid is provided at a location a predetermined distance below the shoulder joint in the gravity direction, seating with a stable posture can be made possible by defining the height of the seat to make the shoulder joints coincide with the range, whereby the robot can be enabled to keep a stable posture from before to after sitting down.

Further, since the legged mobile robot recited in claim 5 is configured such that the seating aid is provided at a location within a range of $H\pm\{(\frac{1}{3})\cdot H\}$ from the ground contact surface of the foot, when the robot is seated, if a distance from the ground contact surface of the foot to the knee joint is defined as H, when the biped robot performs various tasks in the seated state, the shoulder joints can be positioned at a height that facilitates task performance, whereby improvement of work efficiency can be achieved in addition to the foregoing effects.

Further, since the legged mobile robot recited in claim 6 is configured such that a portion of the seating aid that contacts the seat comprises an elastic member, in addition to the effects mentioned above, it is possible to effectively absorb any impact that occurs during seating and further to improve stability during seating, whereby the robot can be enabled to keep a stable posture from before to after sitting down.

Further, since the legged mobile robot recited in claim 7 is configured such that a portion of the seating aid that contacts the seat comprises a rotating member, in addition to the effects mentioned above, the center of gravity of the robot is made still easier to move forward, whereby the robot can be enabled to keep a still more stable posture from before to after sitting down. Further, seating in a stable posture is possible irrespective of the posture of the body, and even if the seat has some amount of inclination, its effect is not felt and a stable posture can be maintained from before to after sitting down.

Further, since the legged mobile robot recited in claim 8 is configured such that a portion of the seating aid that contacts the seat comprises a rotating member fabricated from an elastic material, as mentioned with reference to claims 6 and 7, impact at the time of sitting can be absorbed and the center of gravity of the robot is made still easier to move forward, whereby the robot 1 can be enabled to keep a still more stable posture from before to after sitting down. Further, with configuration simpler than those mentioned with reference to claims 6 and 7, it becomes possible to obtain similar effects those mentioned with reference to the claims.

Further, since the legged mobile robot recited in claim 9 is configured such that the seating aid is provided with a terminal for charging a battery that powers an onboard equipment of the robot, battery charging and other such maintenance tasks are further simplified.

BRIEF DESCRIPTION OF THE DRAWINGS

FIG. 10 is a front view of a body frame shown in FIG. 6 and the like.

FIG. 11 is a side view of the body frame shown in FIG. 6 and the like.

FIG. 12 is a partial perspective view of the lower end of the body frame shown in FIG. 6 and the like.

BEST MODES OF CARRYING OUT THE INVENTION

The best modes for implementing the legged mobile robot according to this invention will be explained with reference to the attached drawings in the following.

First Embodiment

A legged mobile robot according to a first embodiment of this invention will be explained with reference to the attached drawings in the following. Note that a biped robot will be taken as an example of a legged mobile robot.

Figure 1:
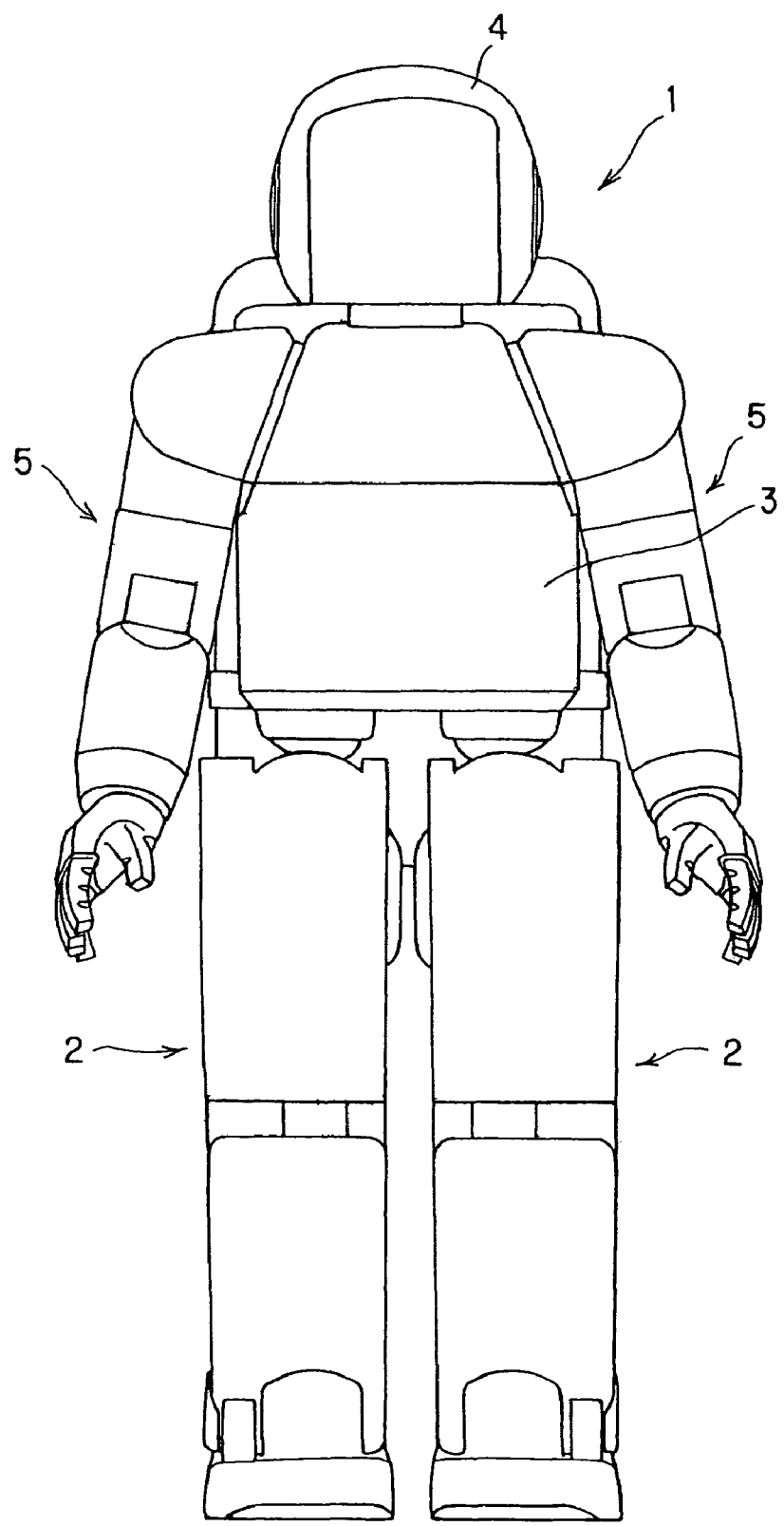
FIG. 1 is a front view of a legged mobile robot (biped robot) according to a first embodiment of this invention.

FIG. 1 is a front view of the biped robot (hereinafter called "robot") 1 and

Figure 2:
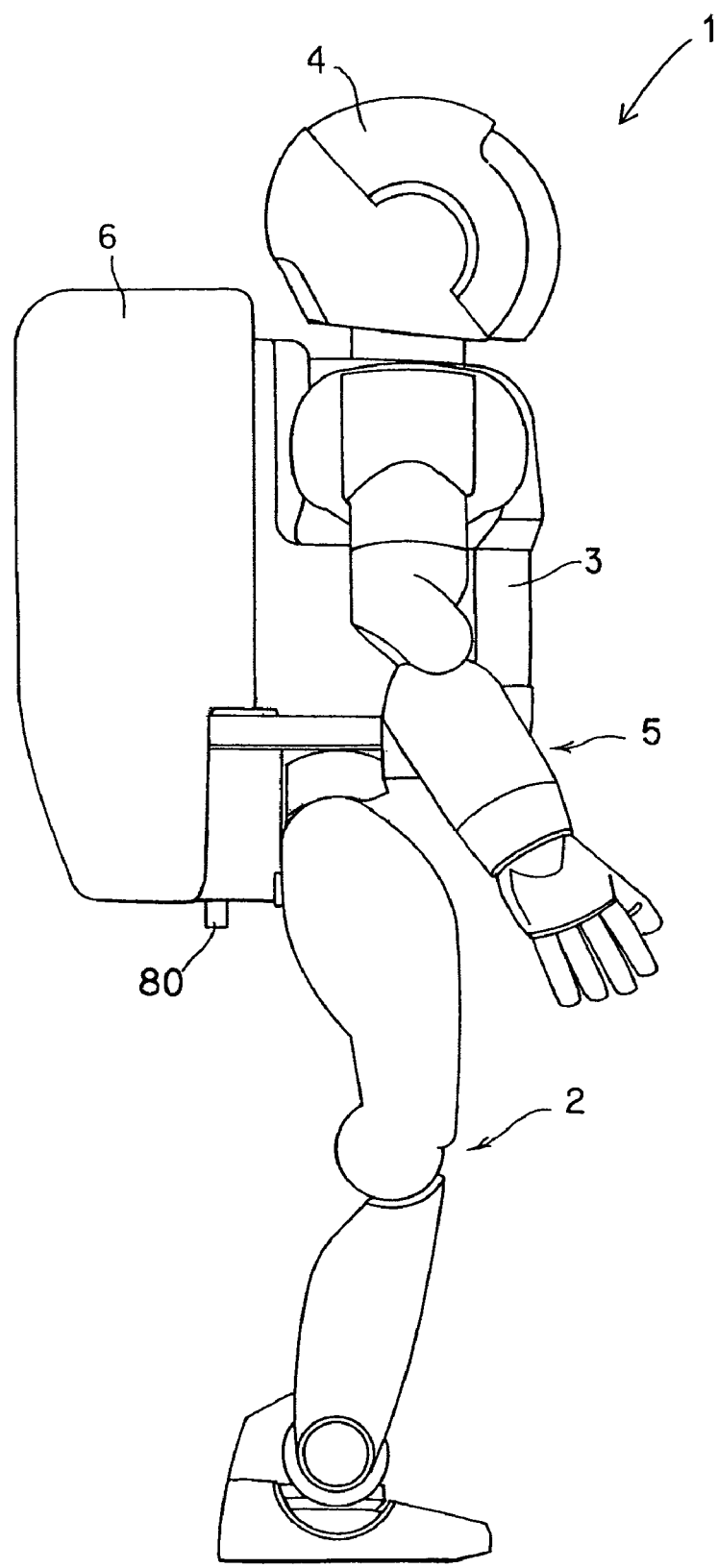
FIG. 2 is a side view of the robot shown in FIG. 1.

FIG. 2 is a side view thereof.

As shown in FIG. 1, the robot 1 has two leg linkages (hereinafter called "legs") 2, and a body (upper body) 3 is provided thereabove. A head 4 is provided on top of the body 3 and two arm linkages (hereinafter called "arms") 5 are connected to opposite sides of the body 3. Further, as shown in FIG. 2, a housing unit 6 is provided on the back of the body 3 and accommodates therein, inter alia, an ECU (Electronic Control Unit; explained below) and a battery power source (not shown) for electric motors (onboard equipment) for driving the joints of the robot 1. Note that the robot 1 shown in FIGS. 1 and 2 is depicted as one attached with covers for protecting the internal structure.

The internal structure of the aforesaid robot 1 will be explained with reference to FIG. 3, focusing on the joints.

As illustrated, the left and right legs 2 of the robot 1 are each provided with six joints. The total of twelve joints comprise joints 10R, 10L (the right side being designated R and the left side L; hereinafter the same) about the hip vertical axis (Z axis or gravity axis) for leg swiveling, roll direction (about X axis) joints 12R, 12L of hips (crotch), pitch direction (about Y axis) joints 14R, 14L of the hips (crotch), pitch direction (about Y axis) joints 16R, 16L of knees, pitch direction (about Y axis) joints 18R, 18L of ankles, and roll direction (about X axis) joints 20R, 20L of the ankles. Feet 22R, 22L are attached to the bottoms of the legs 2R(L).

Figure 4:
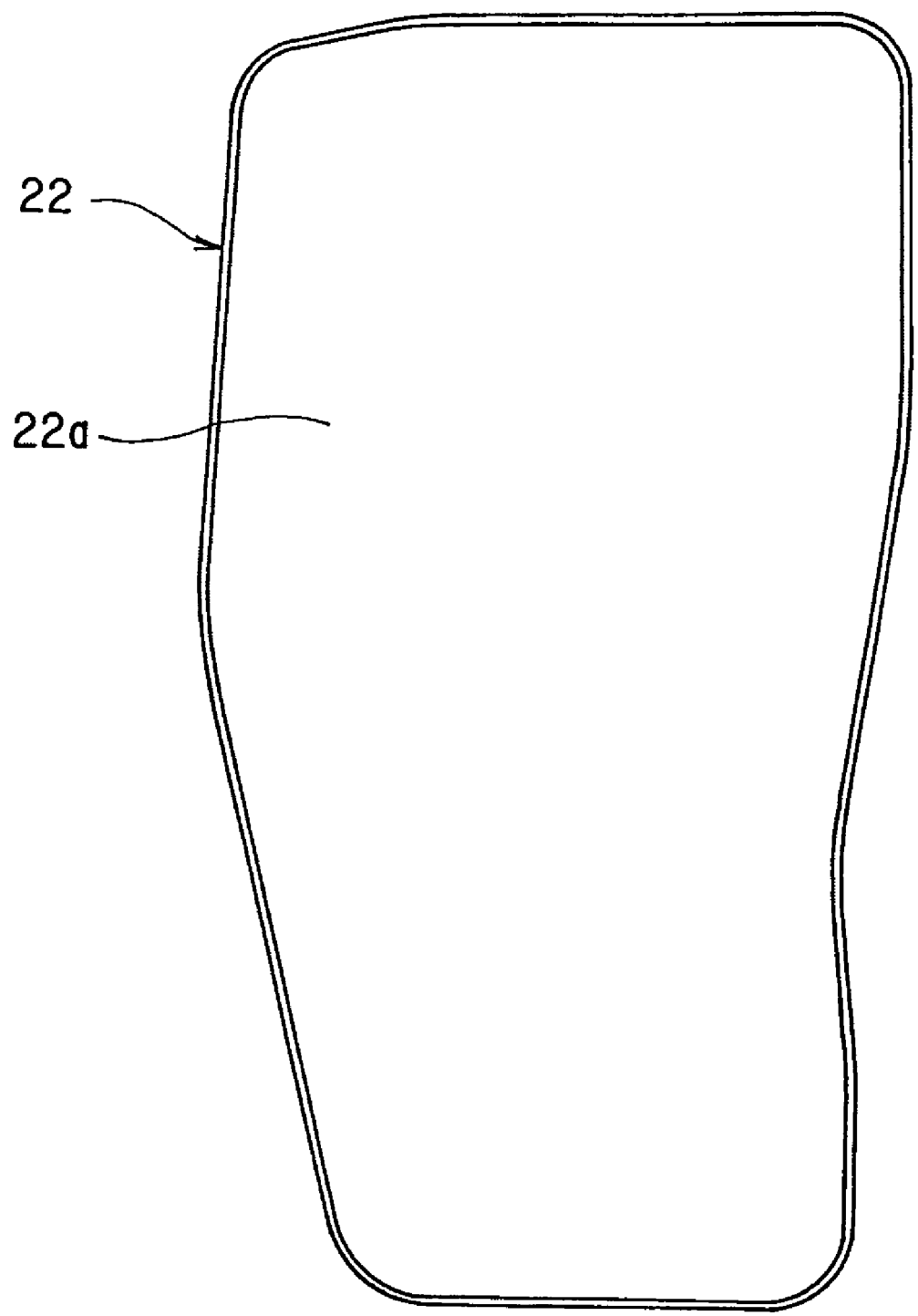
FIG. 4 is a bottom view of a foot of the robot shown in FIG. 1.

As shown in FIG. 4, elastic members 22a made of rubber or the like are bonded to the bottoms (ground-contact surfaces) of the feet 22R, 22L over their full area to constitute ground contact surfaces of the feet 22R(L). The specific material of the elastic members 22a constituting the ground contact surfaces of the feet 22R(L) is rubber whose coefficient of friction is on the order of approximately 0.6.

Thus the legs 2 are constituted of the hip joints (crotch joints) 10R(L), 12R(L), 14(R)L, knee joints 16R(L), and ankle joints 18R(L), 20R(L). The hip joints and knee joints are connected by thigh links 24R(L), and the knee joints and ankle joints by shank links 26R(L).

Figure 3:
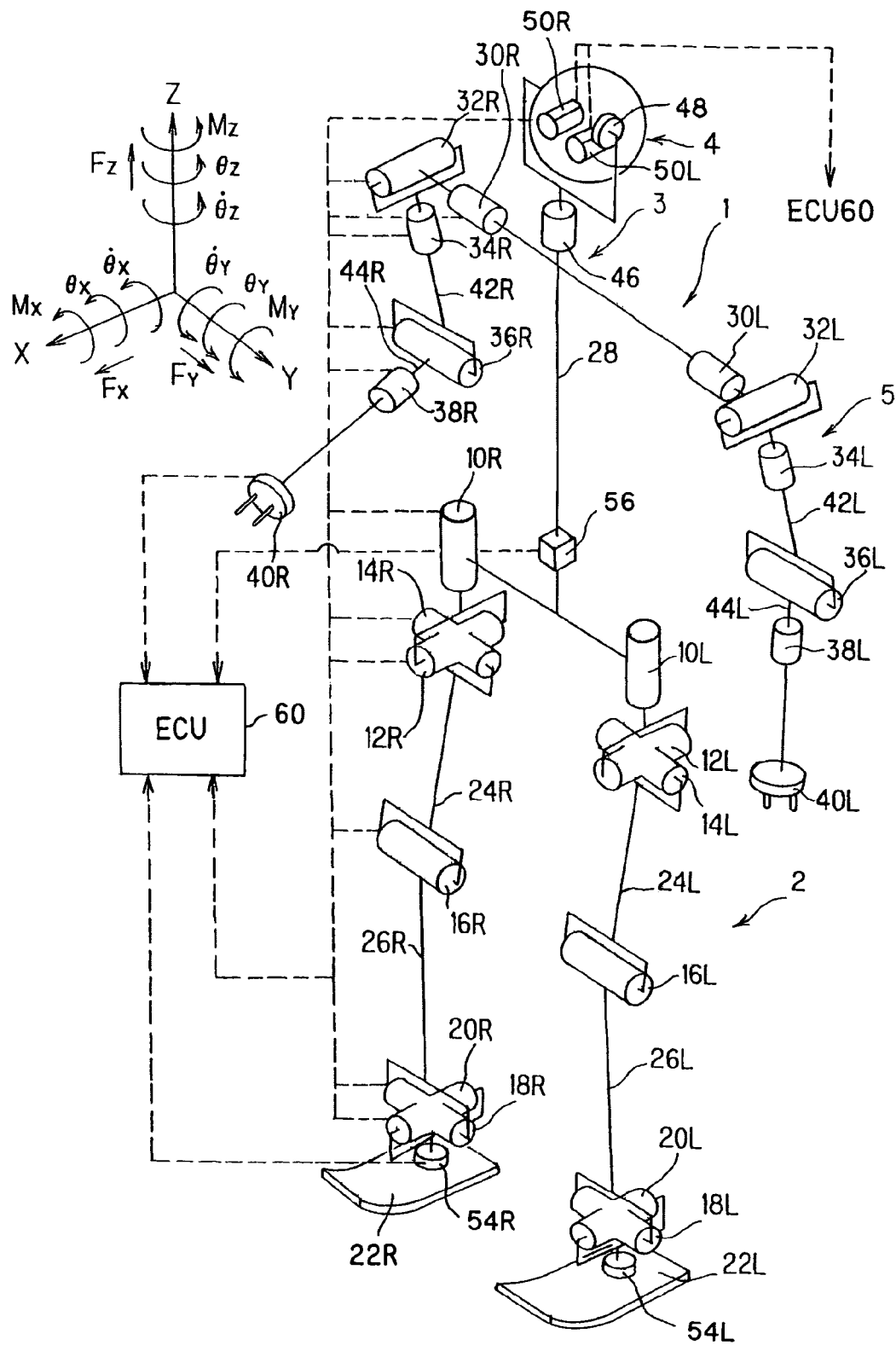
FIG. 3 is a skeletonized view for explaining internal structure of the robot shown in FIG. 1 with focus on its joints.

Although the legs 2 are connected to the body 3 through the hip joints, the body 3 is represented schematically in FIG. 3 as a body link 28. As mentioned earlier, the arms 5 are connected to the body 3. The arms 5 comprise shoulder pitch direction (about Y axis) joints 30R(L), shoulder roll direction (about X axis) joints 32R(L), joints 34R(L) about the vertical axis for arm swiveling, elbow pitch direction (about Y axis) joints 36R(L), and joints 38R(L) about the vertical axis for wrist swiveling. Hands (end effectors) 40R(L) are attached to the distal ends of the wrists.

Thus the arms 5 comprise the shoulder joints 30R(L), 32R(L) and 34R(L), the elbow joints 36R(L) and the wrist joints 38R(L). Further the shoulder joints and the elbow joints are connected by upper arm links 42R(L), and the elbow joints and hands by forearm links 44R(L).

The head 4 comprises a neck joint 46 about the vertical axis and a head rotating mechanism 48 for rotating the head 4 at an axis perpendicular thereto. Two CCD cameras (imaging means) 50R(L) are mounted laterally in parallel inside the head 4 so as to enable stereoscopic vision (binocular vision). The images (color images) obtained from the CCD cameras 50R(L) are sent to an ECU 60, where they are subjected to moving object detection processing.

As mentioned above, the left and right legs 2R(L) of the robot 1 are imparted with a total of twelve degrees of freedom, whereby during walking the legs can be operated by driving the twelve joints to appropriate angles so that, with the feet 22R(L) being made to contact the floor, desired walking (movement) over a floor (not shown in FIG. 3) in three-dimensional space is enabled. Further, the left and right arms 5 are each given five degrees of freedom, so that desired works can be carried out in three-dimensional space (workspace) by driving these joints to appropriate angles so as to operate the arms 5.

Conventional six-axis force sensors 54R(L) are attached to the feet 22R(L) below the ankle joints and produces outputs or signals representing, among the external forces acting on the robot 1, the floor reaction force components Fx, Fy and Fz of three directions and the moment components Mx, My and Mz of three directions acting on the robot 1 from the surface of contact. In addition, an inclination sensor 56 is installed on the body 3 and produces an output or signal representing inclination relative to vertical axis and the angular velocity thereof.

As mentioned above, the ECU 60, comprising a microcomputer, and the like are housed inside the housing unit 6, and the outputs of the six-axis force sensors 54R(L) and other sensors and the image outputs of the CCD cameras 50R(L) are sent to the ECU 60.

Figure 5:
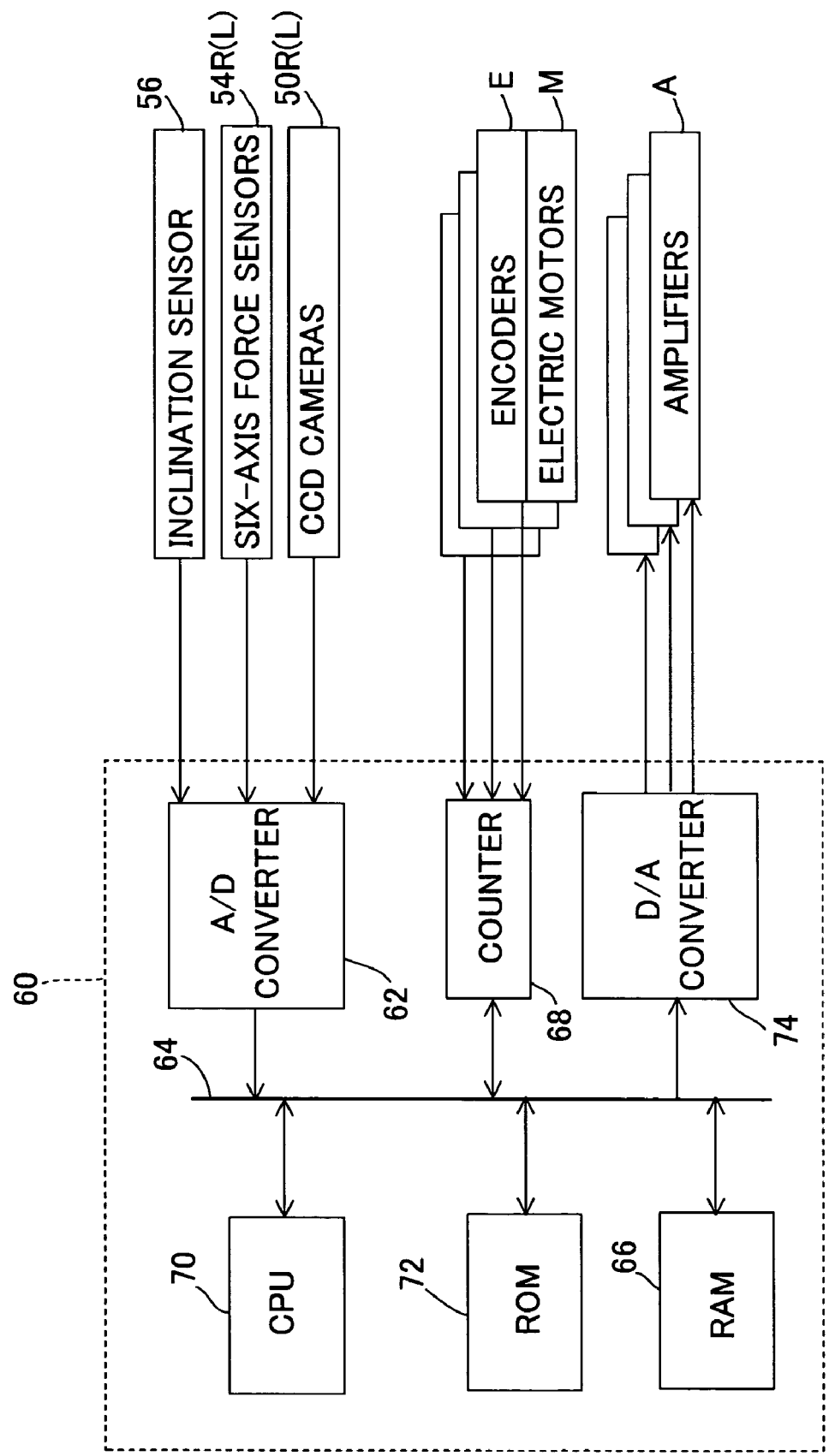
FIG. 5 is a block diagram representing the configuration of an ECU shown in FIG. 3 in detail.

FIG. 5 is a block diagram representing the configuration of the ECU 60 in detail. As illustrated, the outputs of the six-axis force sensors 54R(L), CCD cameras 50R(L) etc. are converted into digital signals by an A/D converter 62 inside the ECU 60 and then sent via a bus 64 to a RAM 66 for storage. Further, the outputs of encoders E installed adjacent to the electric motors M for driving the respective joints are inputted to the RAM 66 through a counter 68.

Further, a CPU 70 is provided in the ECU 60. Based on the various data stored in a ROM 72 and the various outputs stored in the RAM 66, the CPU 70 calculates the control values (control inputs) of the electric motors M needed for driving the joints and outputs them to the motors M through a D/A converter 74 and amplifiers A.

What is characteristic in the robot 1 shown in FIG. 1 etc. is that seating aids 80 are provided on at least one between the body 3 and the legs 2, particularly the body 3, to enable sitting on a seat 82. This will be explained in the following.

Figure 6:
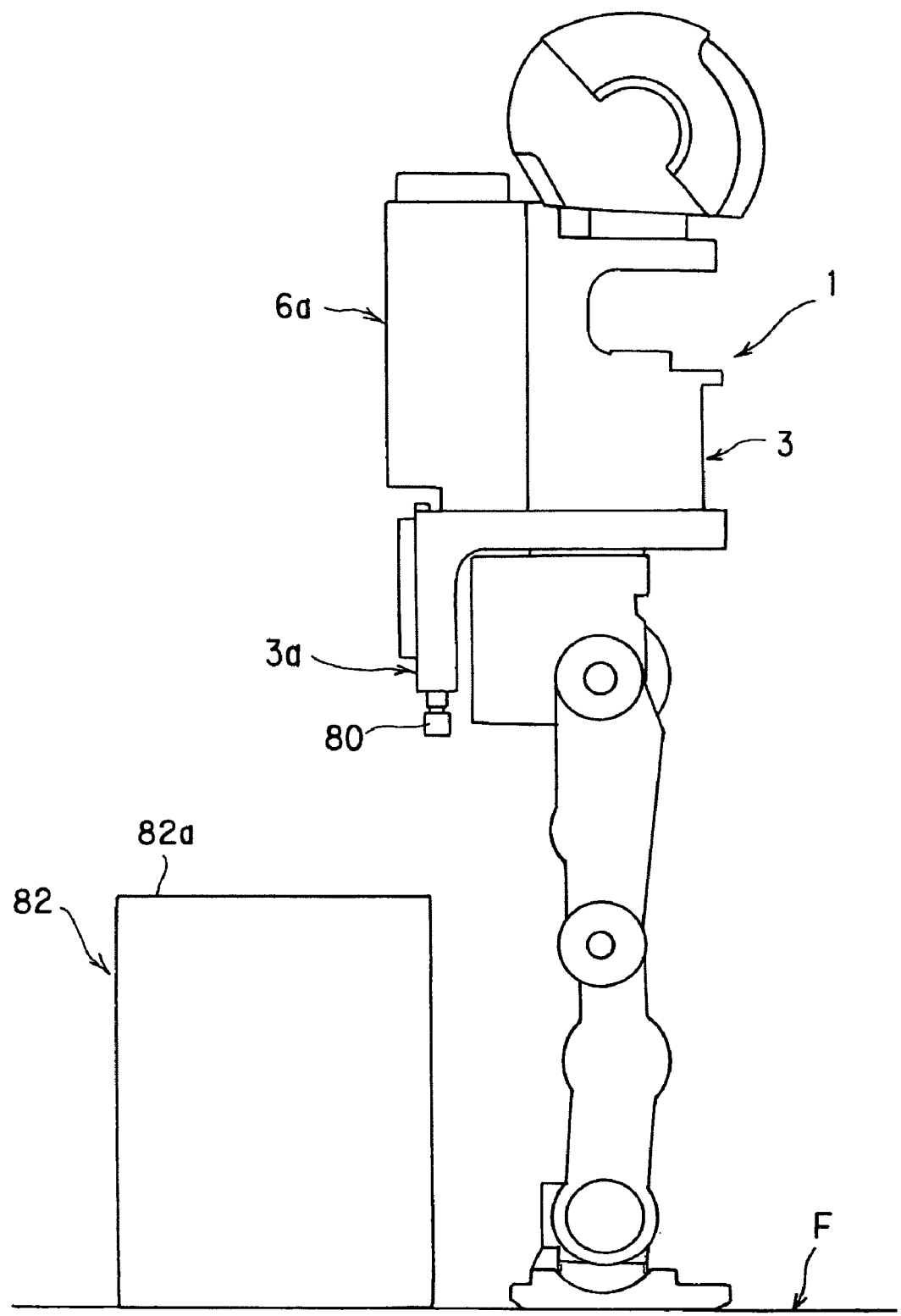
FIG. 6 is a side view of the robot shown in FIG. 1 showing the motion of the robot when seating itself on a seat to be supported by seating aids.
Figure 7:
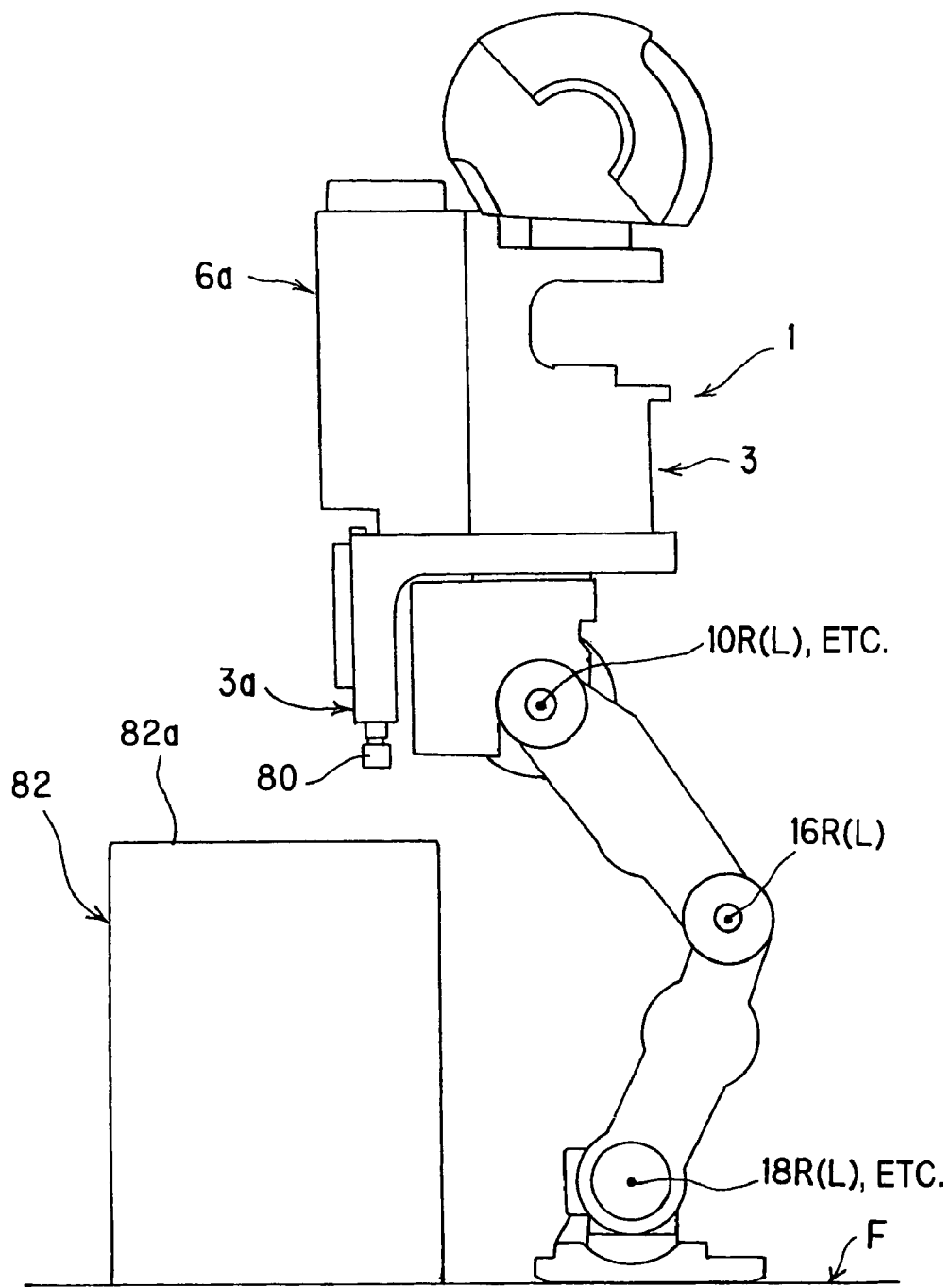
FIG. 7 is a side view of the robot shown in FIG. 1 showing the motion of the robot when seating itself on the seat to be supported by the seating aids.
Figure 8:
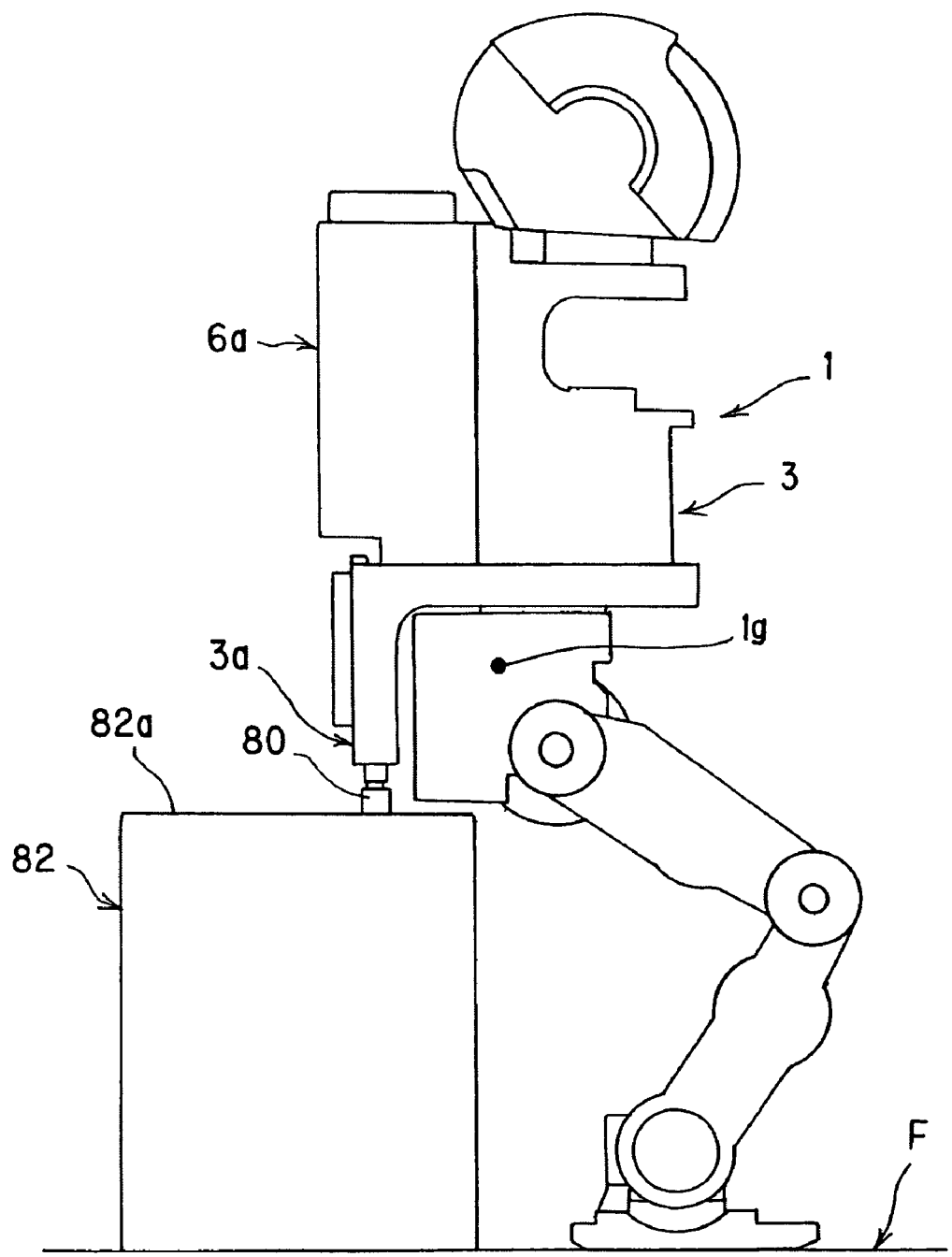
FIG. 8 is a side view of the robot shown in FIG. 1 similarly showing the motion of the robot when seating itself on the seat to be supported by the seating aids.
Figure 9:
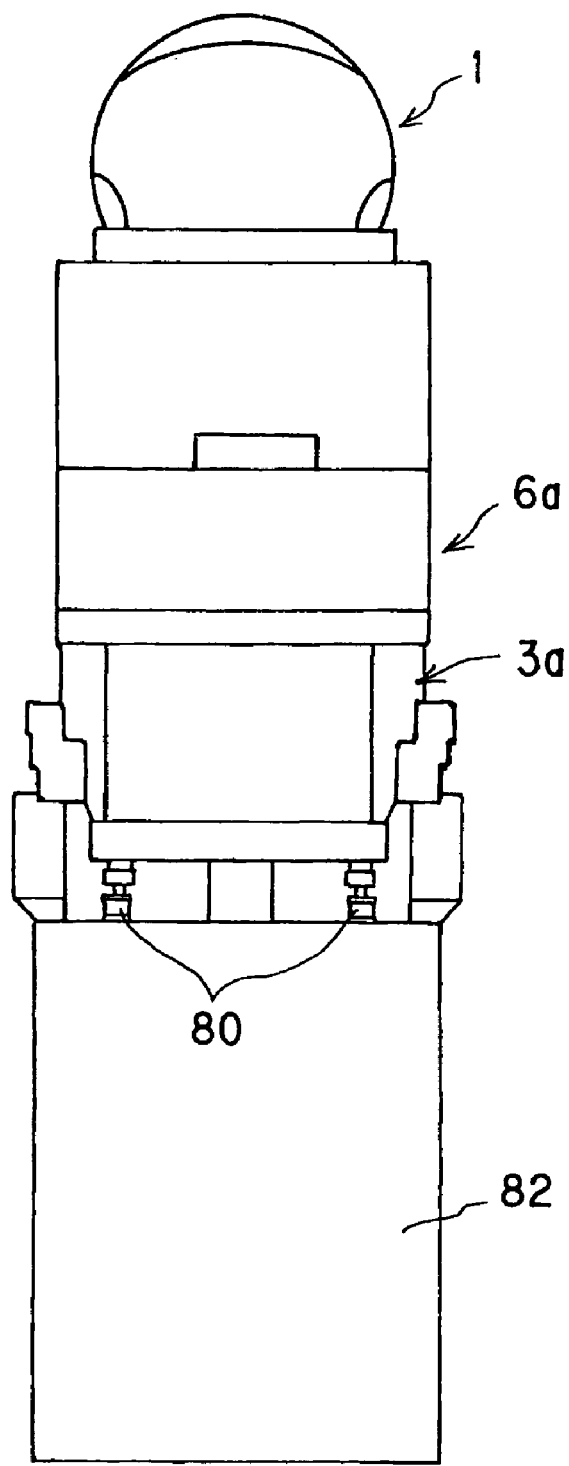
FIG. 9 is a back view of the robot after the motion of sitting down shown in FIG. 8.

FIGS. 6 to 8 are side views of the robot 1 showing the motion of the robot 1 over time when seating itself on the seat 82 to be supported by the seating aids 80, and FIG. 9 is a back view of the robot 1 after sitting down. Note that in order to show the attachment of the seating aids 80 to the body 3 in detail, the robot 1 is shown in FIG. 6 etc. with the head 4 excluded and with the covers for protection of the internal structure shown in FIG. 1 etc. removed.

As shown in FIG. 6 and other drawings, the housing unit 6 (housing case 6a) on the back of the body 3 is boxlike and a body frame 3a of L-shape as viewed from the side is disposed thereunder. Note that some of the onboard equipment, such as the ECU 60 and motor drive circuits are housed in the housing case 6a.

Figure 10:
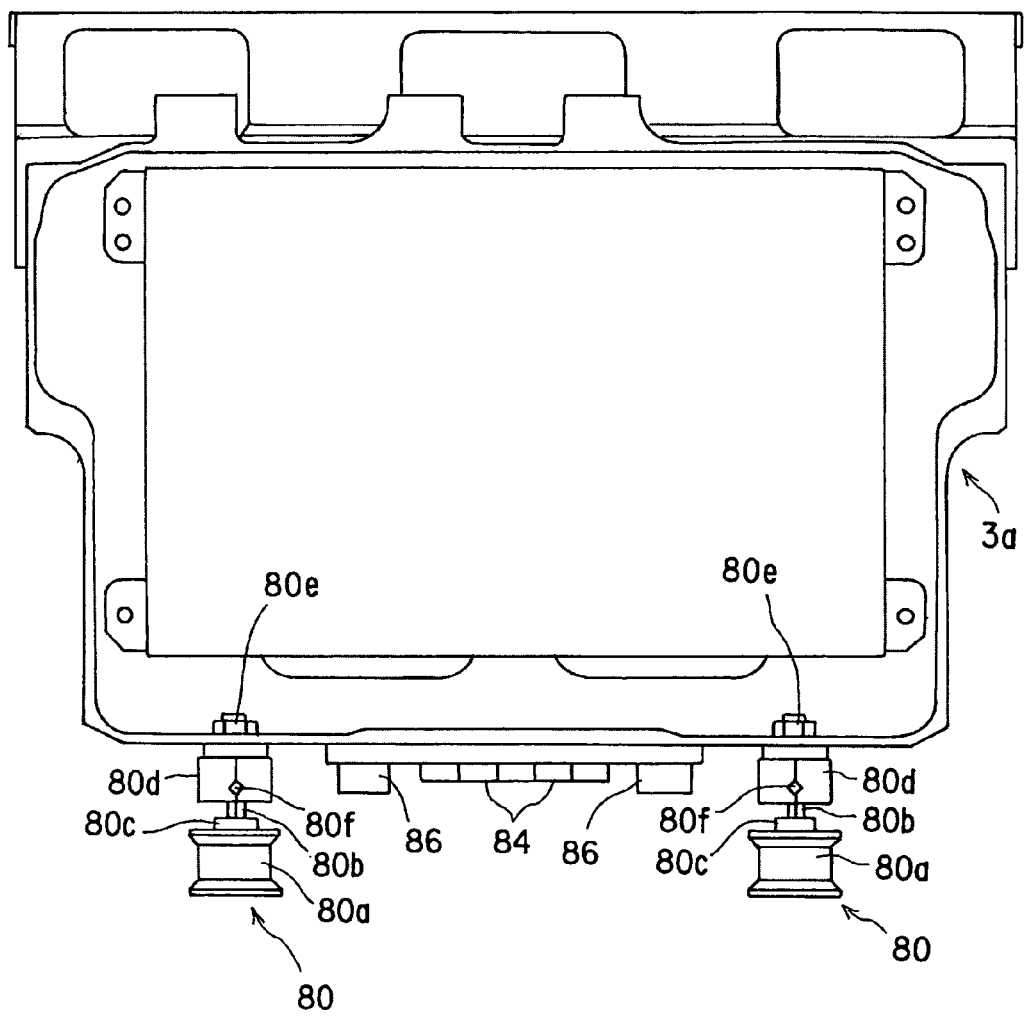
Figure 11:
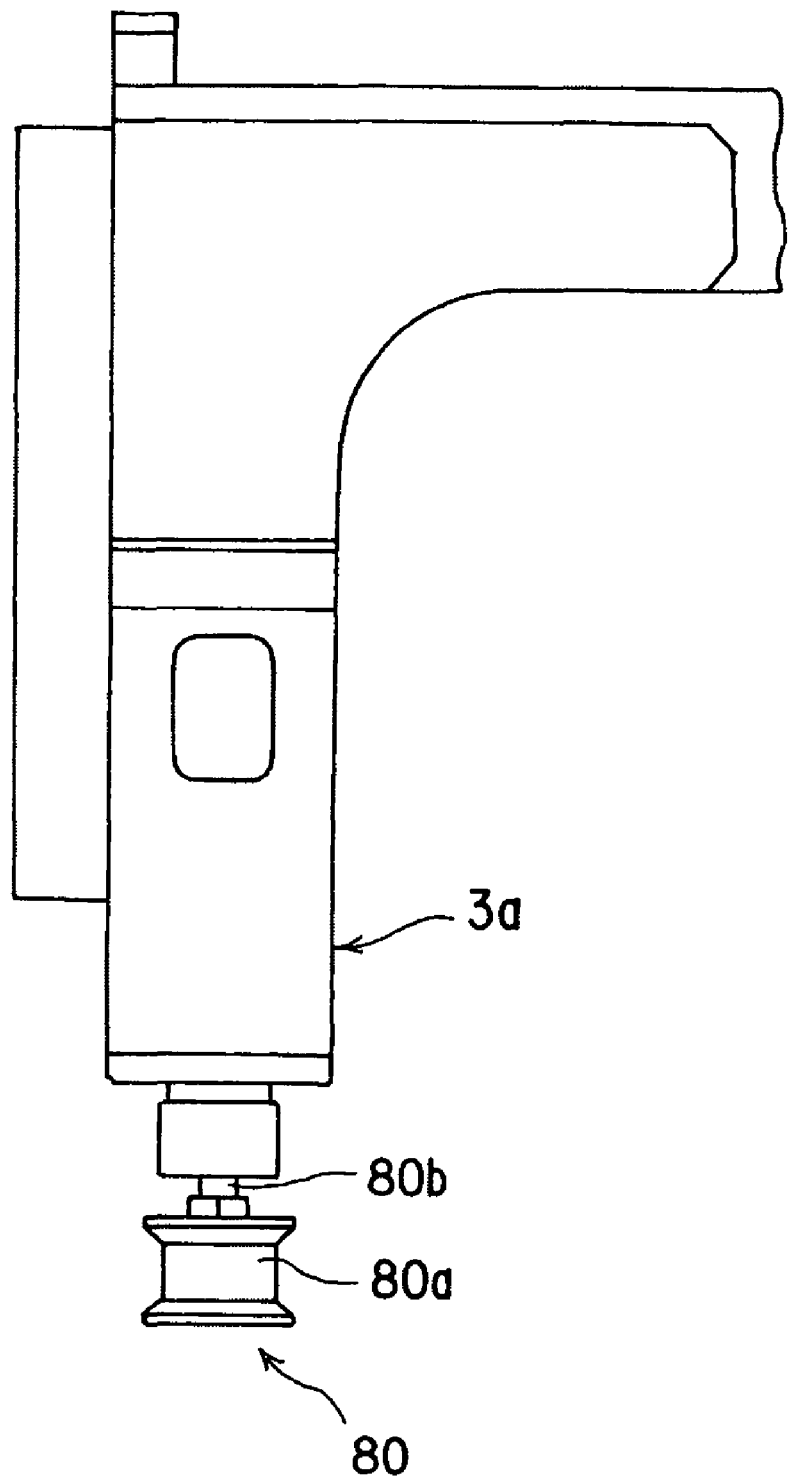
Figure 12:
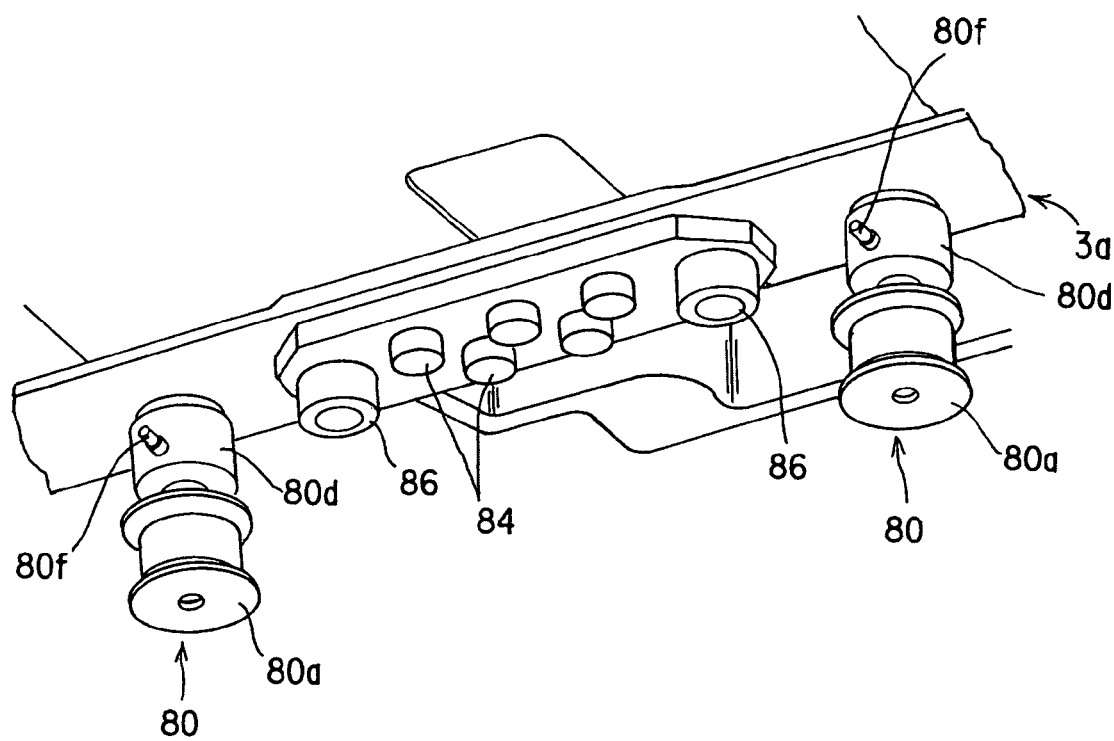

FIG. 10 is a front view of the body frame 3a, FIG. 11 is a side view of the body frame 3a, and FIG. 12 is a partial perspective view of the lower end of the body frame 3a.

Two seating aids 80 are attached to the lower end of the body frame 3a as spaced apart from each other. As best shown in FIG. 12, the seating aid 80 comprises a cylindrical member 80a. The member 80a is made of a vibration damping material such as vibration proof rubber. The member 80a has a bolt 80b inserted therein and is fastened to the bolt 80b by means of a nut 80c. A load cell (load sensor) 80d is disposed between the member 80a and the lower end of the body frame 3a. The bolt 80b passes through the load cell 80d, extends upward through a hole formed in the lower end of the body frame 3a, and is fastened by a nut 80e. Thus the member 80a and load cell 80d are attached to the lower end of the body frame 3a by the bolt 80b, whereby the seating aid 80 is mounted (provided) on the body 3.

To explain the sitting motion of the robot 1 with reference to FIGS. 6 to 8, the ECU 60 operates the individual electric motors M so that, as shown in FIG. 6, the robot 1 standing upright in front of the seat 82 greatly bends its knee joints 16R(L) etc., also bends its hip joints (10R(L) etc.) relative to the body 3, and further bends its ankle joints (18R(L) etc.) relative to the feet 22R(L), as shown in FIG. 7, thereby lowering the seating aids 80 toward the seat 82, and stops the operation of the electric motors M in the state where, as shown in FIG. 8, the seating aids 80 thoroughly contact the seating surface 82a of the seat 82.

At this time, the members 80a of the seating aids 80 absorb the impact when the robot 1 seats itself on the seat 82 and the load cells 80d produce outputs proportional to the load caused by the contact and send them to the ECU 60 through a harness 80f. As shown in FIG. 9, the robot 1 can be seated on the seat 82 in a stable posture because it is supported by the two seating aids 80. Note that, as is clear from FIG. 7 through FIG. 8, the robot is controlled to maintain its upright posture when it is seated. After seated, much of the weight of the robot 1 above the body 3 is supported by the seat 82.

As is clear from FIG. 8, the seating aids 80 are provided at locations that is rearward of the center of gravity 1g (of the robot 1) when the robot 1 is seated. Further, the material of the member 80a (corresponding to the region of the seating aid 80 that contacts the seating surface 82a of the seat 82) is an elastic material. Specifically, it is a material whose contact surface has been subjected to fluororesin-system coating or other such friction-reducing treatment, and its coefficient of friction is on the order of about 0.1 and smaller than that of the aforesaid elastic members 22a of the feet 22R(L).

Further, the coefficient of friction of the member 80a of the seating aid 80 is relatively low, as mentioned above, and the seating aid 80 merely makes contact with the seating surface 82a of the seat 82 through the member 80a and can therefore move (slide) relative to the seating surface 82a of the seat 82. Note that the seat 82 is made of aluminum material and the seating surface 82a is formed by subjecting the aluminum material to fluororesin-system coating or other such friction-reducing treatment so as to have a coefficient of friction on the order of about 0.1.

Note that the symbol 84 in FIG. 12 designates terminals for charging the battery that powers the onboard equipment of the robot 1. Thus terminals 84 are provided adjacent to the seating aids 80. The symbol 86 designates positioning guides for a cover or the like.

Next, explanation will be made with reference to FIGS. 13 and 14 regarding the position (height) and the like of the shoulder joints (30R(L) etc.) of the robot 1 according to this embodiment.

Figure 13:
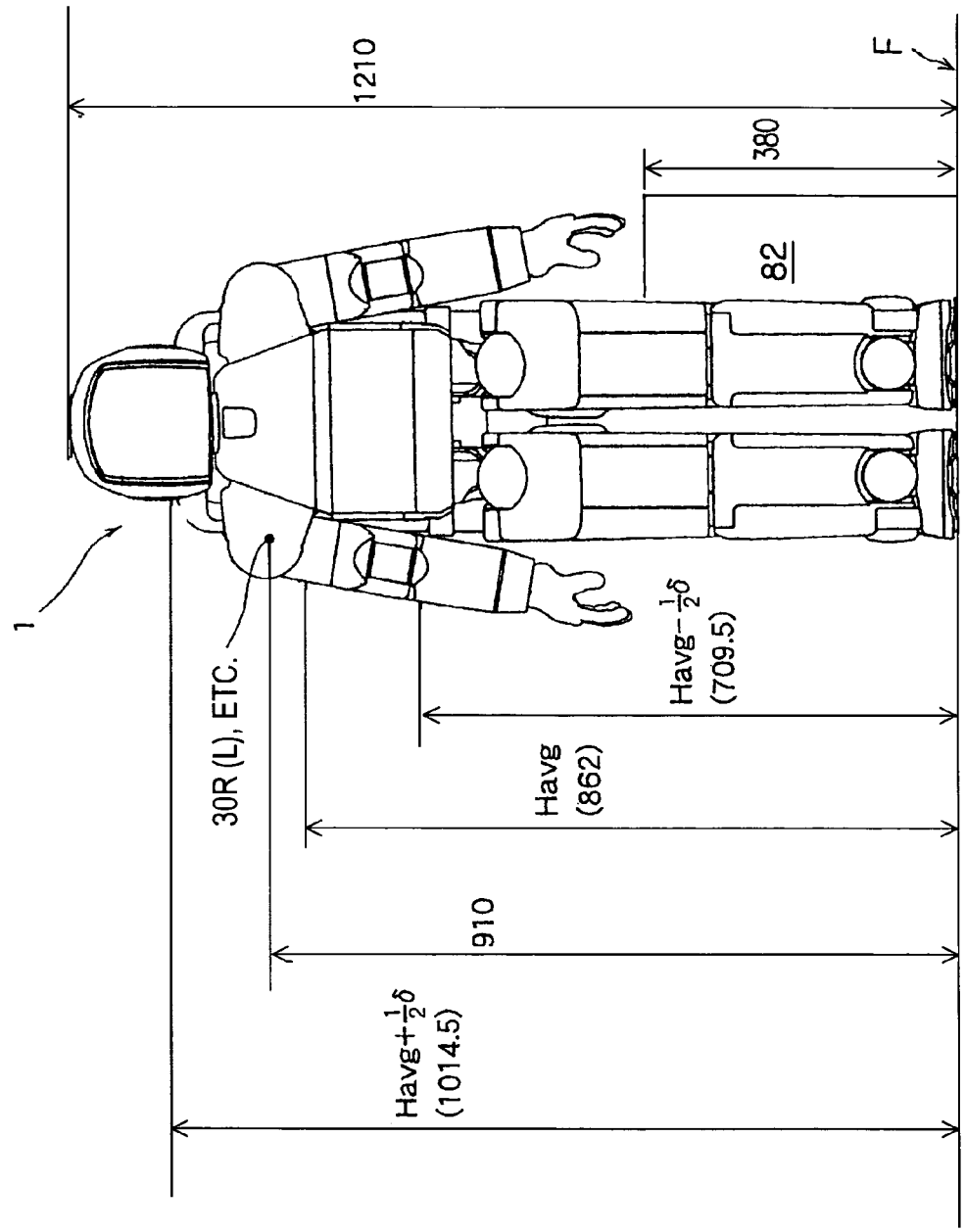
FIG. 13 is a front view of the legged mobile robot showing, inter alia, the height from the floor surface of shoulder joints of the robot shown in FIG. 1.
Figure 14:
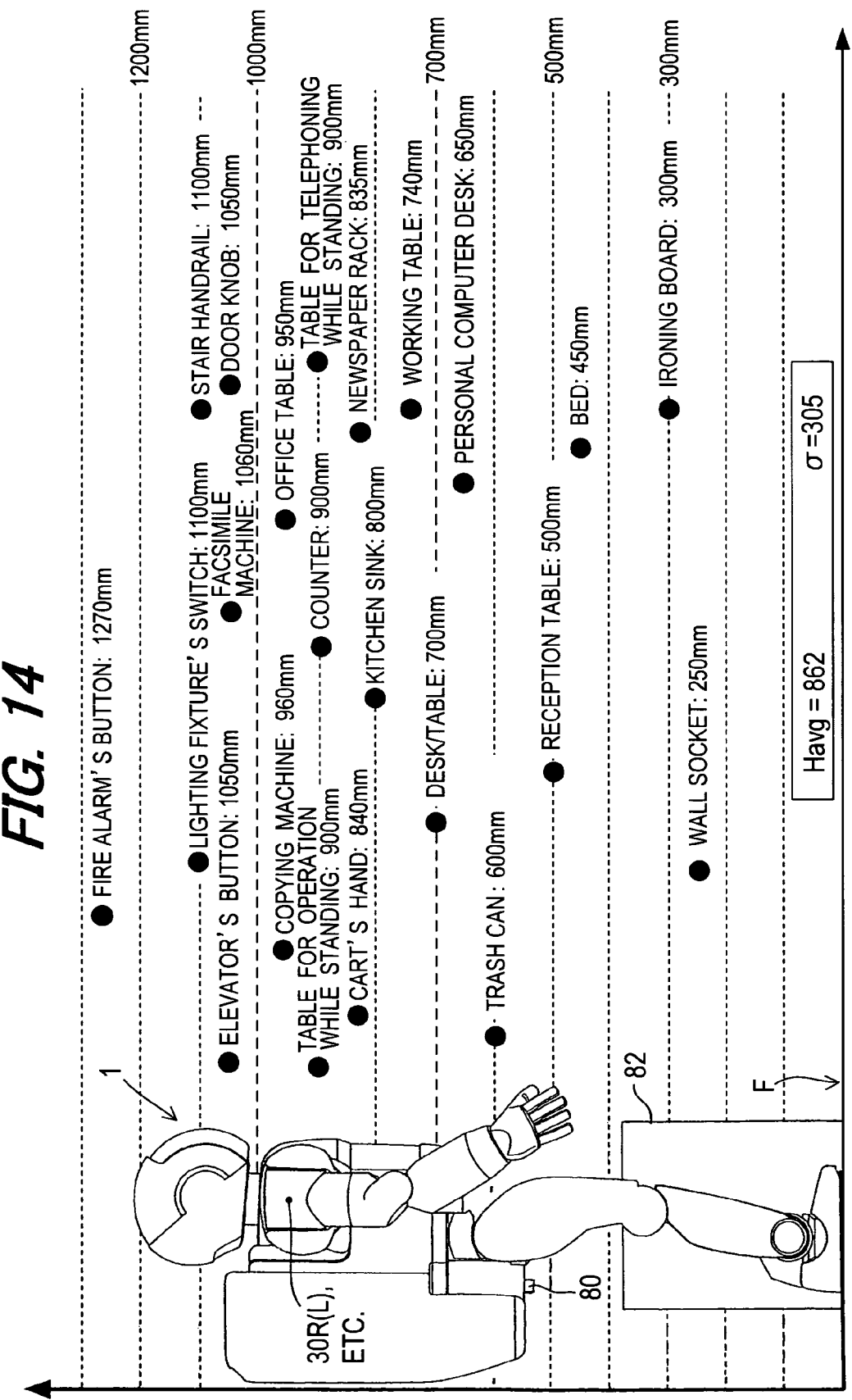
FIG. 14 is a side view of the robot shown in FIG. 1 showing a group of objects to be manipulated by the robot.

FIG. 13 is a front view of the robot 1 showing, inter alia, the height from the floor surface F of the shoulder joints, and FIG. 14 is a side view of the robot 1 showing a group of objects to be manipulated.

The purpose of the robot 1 according to this embodiment is to carry out light tasks chiefly in a home, office or other such workspace, and as the objects to be manipulated or worked at this time there can be mentioned the ones shown in FIG. 14, for example. Note that the relationships between the objects and their heights from the floor surface F indicated in FIG. 14 are some of the typical ones among those recommended by the JIS (Japanese Industrial Standards) on construction, which in addition to those shown in FIG. 14 also prescribe recommended heights for, for example, coat hangers and a large number of other furnishings used in home environments.

As can be seen from FIG. 14, many of the objects to be manipulated or worked in a home environment are distributed within a specific height range, specifically a range of from 700 mm to 1,100 mm. Now taking the averaged value Havg of the heights of the group of objects, we get about 862 mm. Further, if we derive the standard deviation σ of the distribution of these using the conventional standard deviation equation, we get about 305 mm (note that this averaged value and recommended heights include the recommended heights of various articles other than the illustrated objects). That is, it can be said that the objects are concentrated in the range of averaged value Havg±½ standard deviation σ (709.5 mm-1014.5 mm). Note that this tendency can naturally be frequently observed in factories and other human activity spaces.

Next, the height of the shoulder joints of the robot 1 from the floor surface F (in other words, the height from the ends of the legs 2 that contact the floor surface F, i.e., the ground-contact surface of the feet 22R(L)) which is compatible with the group of objects to be manipulated will be considered. Where the robot 1 is a biped robot emulating a human being, then once the height of the shoulder joints from the floor surface is determined, the ranges within which the stature, length of the arm linkages 5 and the like thereof can fall to be limited from the viewpoint of appearance. Once the approximate length of the arms 5 is determined, the swing range of the arms 5 overall, more specifically the operating region of the hands 40R(L) is also determined from the swing ranges of the shoulder joints (30R(L) etc.) and elbow joints (36R(L).

Therefore, by defining the height of the shoulder joints from the floor surface as approximately "averaged value Havg±½ standard deviation σ of group of manipulated object heights," it is possible to use joints having an ordinary movable range and, while maintaining an upright posture, to position the hands 40L(R) in the overall height range in which the group of objects to be manipulated or worked is concentrated, thereby enabling improvement of performance without risk of placing excessive load on the joints.

Further, "averaged value Havg±½ standard deviation σ of group of manipulated object heights" is within the aforesaid range of 709.5 mm-1014.5 mm as mentioned above and can be said to be approximately 700 mm-1,000 mm. If the height of the shoulder joints (30R(L) etc.) becomes about 700 mm-1,000 mm, then when emulating a human being, the stature ordinarily becomes about 1,000 mm-1,300 mm. This is a height corresponding to that in the lower grades of elementary school and, therefore, by determining the shoulder joint height at 700 mm-1,000 mm, a robot can be provided that offers high performance in a home environment and an appearance (size) that is likable and compatible with human society. For the foregoing reasons, as shown in FIG. 13, the robot 1 according to this embodiment is defined to have a height of the shoulder joints from the floor F of 910 mm and a stature of about 1,210 mm. Note that the length per step when walking is 335 mm.

Next, the height of the robot 1 when seated will be explained.

When the robot 1 whose standing shoulder joint height is, as mentioned above, 910 mm is seated on the seat 82, the objects to be manipulated are limited to those in the approximate height range of 500 mm to 1,000 mm in FIG. 14. When the averaged value Havg of the heights recommended for the manipulated objects in this range by the JIS for construction purposes is calculated, it is found to be about 780 mm, and when the standard deviation a of the distribution of these is calculated by the same method, it is found to be about 240 mm. That is, the objects can be said to be concentrated in the range of averaged value Havg±½ standard deviation σ, i.e., in the range of 660 mm-900 mm.

Further, since the distance between the shoulder joints and the seating aids 80 in the robot 1 is 430 mm, it is found by subtracting this value from the aforesaid manipulated object range when seated (660 mm to 900 mm) that the height from the seating surface 82a (shown in the same drawing) of the seat 82 from the floor surface (ground contact surface of the feet 22R(L)) when the robot 1 is seated on the seat 82 is preferably in the range of 230 mm to 470 mm. In this embodiment, therefore, the height of the seating surface 82a of the seat 82 is defined as 380 mm±10 mm.

The height of the seating surface 82a of the seat 82 from the floor surface (ground contact surface of the feet 22R(L)) will be explained in more everyday terms: One among the necessities in the case where a humanoid biped robot emulating a person coexists in a human living environment can be considered for it to sit on a seat (sit down) and, further, to perform various tasks in the seated state.

Therefore, drawing on accumulated knowledge, the height of seating surface 82a of the seat 82 from the ground contact surface has been defined to be located in the range of H±{(⅓)·H}, where H is the distance from the floor surface to the knee joints during standing; in other words, the height of the seating aids 80 (more exactly, the landing surfaces of the members 80a thereof) to the ground contact surfaces of the feet 22R(L), when seated, has been defined based on the aforesaid manipulated object range, where H is the distance from the ground contact surfaces of the feet 22R(L) to the knee joints 16R(L). Specifically, it has been established at a location within the range of H±{(⅓)·H}. As a result, it has been found that when the biped robot performed various tasks in the seated state, the shoulder joints could be positioned at a height that facilitated task performance (enhanced movability) and made it possible to improve work efficiency. Note that, in FIG. 14, when the robot 1 is standing, the height H of the knee joints from the floor surface F is 350 mm.

In the robot 1 according to this embodiment, the provision of the seating aids 80 on the body 3 makes sitting or seating on a seat possible, so that the space occupied by the robot 1 can be decreased to reduce space during storage (parking) and transport, and also enhance safety in the course of transport. In addition, maintenance work is simplified because immobilization in the seated condition is possible. Still further, the range of tasks is expanded to enable deskwork and the like.

Further, a configuration is adopted which provides the seating aids 80 at a location that, when the robot 1 is seated, is rearward of the center of gravity 1g when the robot 1 is seated, in other words, a configuration is adopted such that the seating aids 80 are provided at a location in the direction opposite from the feet 22R(L), which receive the floor reaction force, whereby the moment acting on the robot 1 about the center of gravity during seating does not operate to tilt the robot 1 rearward and, therefore, the robot can be enabled to keep a stable posture from before to after sitting down.

Further, since the seating aids 80 are made displaceable relative to the seat 82, the center of gravity of the robot 1 can be shifted forward and, similarly, the moment acting on the robot 1 about the center of gravity during seating can be prevented from operating to tilt the robot rearward. Moreover, even during standing from the seated state the aforesaid moment can be made to operate in the desired manner so that the robot can be enabled to keep a stable posture from before to after sitting down.

Further, the coefficient of friction of the material constituting the members 80a of the seating aids 80, which come in contact with the seat 82, is made smaller than that of the material constituting the ground contact surfaces (elastic members 22a) of the feet 22R(L), i.e., a configuration is adopted that such that the frictional force of the seating aids 80 relative to the seat 82 is made smaller than that of the ground contact surfaces of the feet 22R(L) relative to the floor surface F, so that the moment about the center of gravity acting on the robot 1 during seating can be made to operate in the desired manner, e.g., can be made to operate so as not to tilt the robot 1 rearward, and the aforesaid moment can also be made to operate in the desired manner even during standing from the seated state, whereby the robot can be enabled to keep a stable posture from before to after sitting down.

Further, the height to the shoulder joint from the ground contact surfaces of the feet 22, i.e., from the elastic members 22a, when seated is defined within a range determined based on an averaged value obtained by averaging the heights of the objects to be worked from the floor surface F and their deviations, so that the height of the shoulder joints can be optimally determined in accordance with the heights of the objects to be worked when seated. Further, a configuration is adopted such that the seating aids 80 are provided at a location a predetermined distance, specifically 430 mm, below the shoulder joints in the gravity direction, so that seating with a stable posture can be made possible by defining the height of the seating surface 82a of the seat 82 to make the shoulder joints coincide with the range, whereby the robot can be enabled to keep a stable posture from before to after sitting down.

Further, speaking more generally, a configuration is adopted such that when the robot is seated the seating aids 80 are provided at a location within the range of H±{(⅓)·H} from the ground contact surfaces, where H is the distance from the ground contact surfaces of the feet 22R(L), i.e., the elastic members 22a, to the knee joints, so that when the biped robot performs various tasks in the seated state, the shoulder joints can be positioned at a height that facilitates task performance, whereby improvement of work efficiency can be achieved in addition to the foregoing effects.

Further, a configuration is adopted such that the members 80a of the seating aids 80 that contact the seat 82 are constituted as elastic members, so that, in addition to achieving the foregoing effects, it is possible to effectively absorb any impact that occurs during seating and further to improve stability during seating, whereby the robot can be enabled to keep a stable posture from before to after sitting down.

Further, a configuration is adopted such that the terminals 84 for charging the battery that powers the onboard equipment of the robot 1 are provided at the seating aids 80, more exactly in the vicinity thereof, so that battery charging and other such maintenance tasks are further simplified.

Second Embodiment

Figure 15:
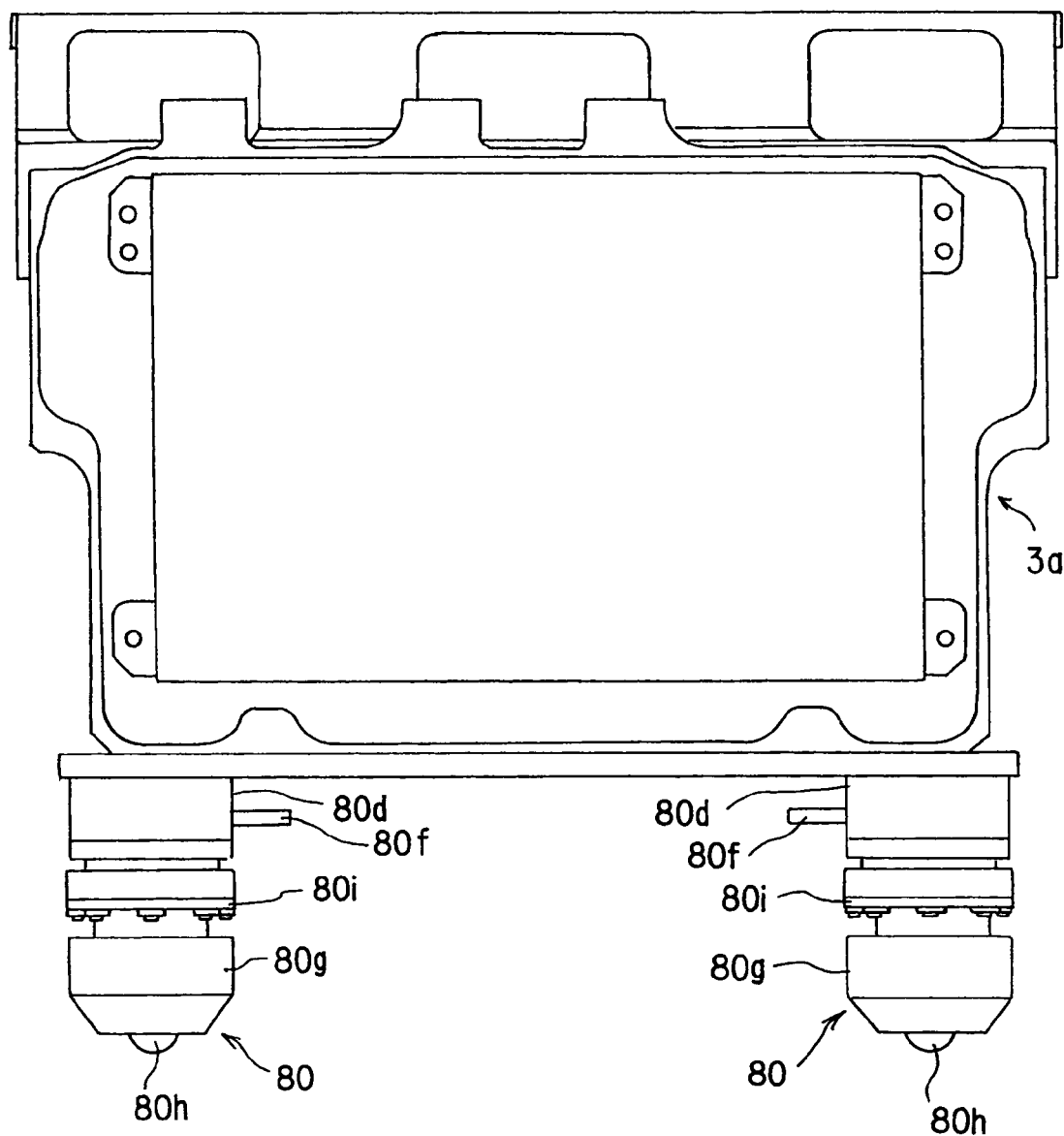
FIG. 15 is a front view of a body frame similar to FIG. 10, which shows a legged mobile robot according to a second embodiment of this invention.
Figure 16:
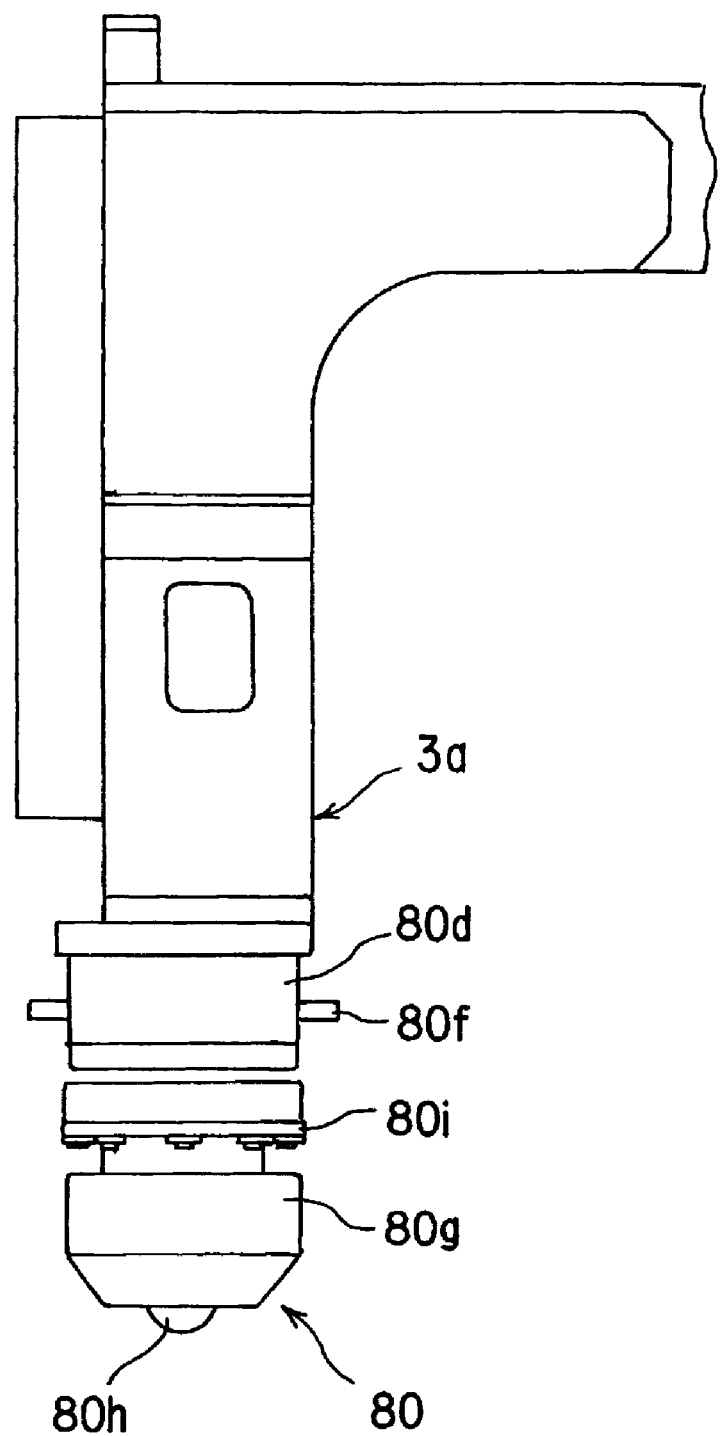
FIG. 16 is a side view of the body frame shown in FIG. 15.

FIGS. 15 and 16 are a front view and a side view of the body frame 3a similar to FIGS. 10 and 11, which show a legged mobile robot according to a second embodiment of this invention.

Although in the second embodiment, similarly to in the first embodiment, two seating aids 80 are attached to the lower end of the body frame 3a as spaced apart from each other, the shape of the seating aids 80 is modified. That is, the seating aid 80 is cylindrical and is equipped with a member 80g that is made of metal or the like and forms a conical frustum toward the tip end, a ball (rotating member) 80h rotatably accommodated therein, and a flange-shaped fitting 80i fastening the member 80g to the lower end of the body frame 3a via the load cell 80d.

As can one might imagine from FIG. 16, the seating aids 80 are, as in the first embodiment, provided so as to be located rearward of the center of gravity 1g (of the robot 1) when the robot 1 is seated. Further, the material of the ball 80h (corresponding to the region where the seating aid 80 contacts the seat 82) is composed of an elastic material such as rubber. That is, the ball 80h is composed of a rotating member fabricated from an elastic material.

Note that in the remaining aspects the configuration and effects are no different from those of the first embodiment.

Since the robot 1 according to the second embodiment is configured in the foregoing manner, it can provide the same effects as explained regarding the first embodiment.

In addition, since the region of the seating aid 80 that contacts the seat 82 (the ball 80h) is a rotating member, more exactly a rotating member fabricated from an elastic material, impact at the time of sitting can be absorbed and the center of gravity of the robot 1 is made still easier to move forward, whereby the robot 1 can be enabled to keep a still more stable posture from before to after sitting down. Further, seating in a stable posture is possible irrespective of the posture of the body 3, and even if the seat has some amount of inclination, its effect is not felt and a stable posture can be maintained from before to after sitting down. Moreover, the structure is simple.

Third Embodiment

Figure 17:
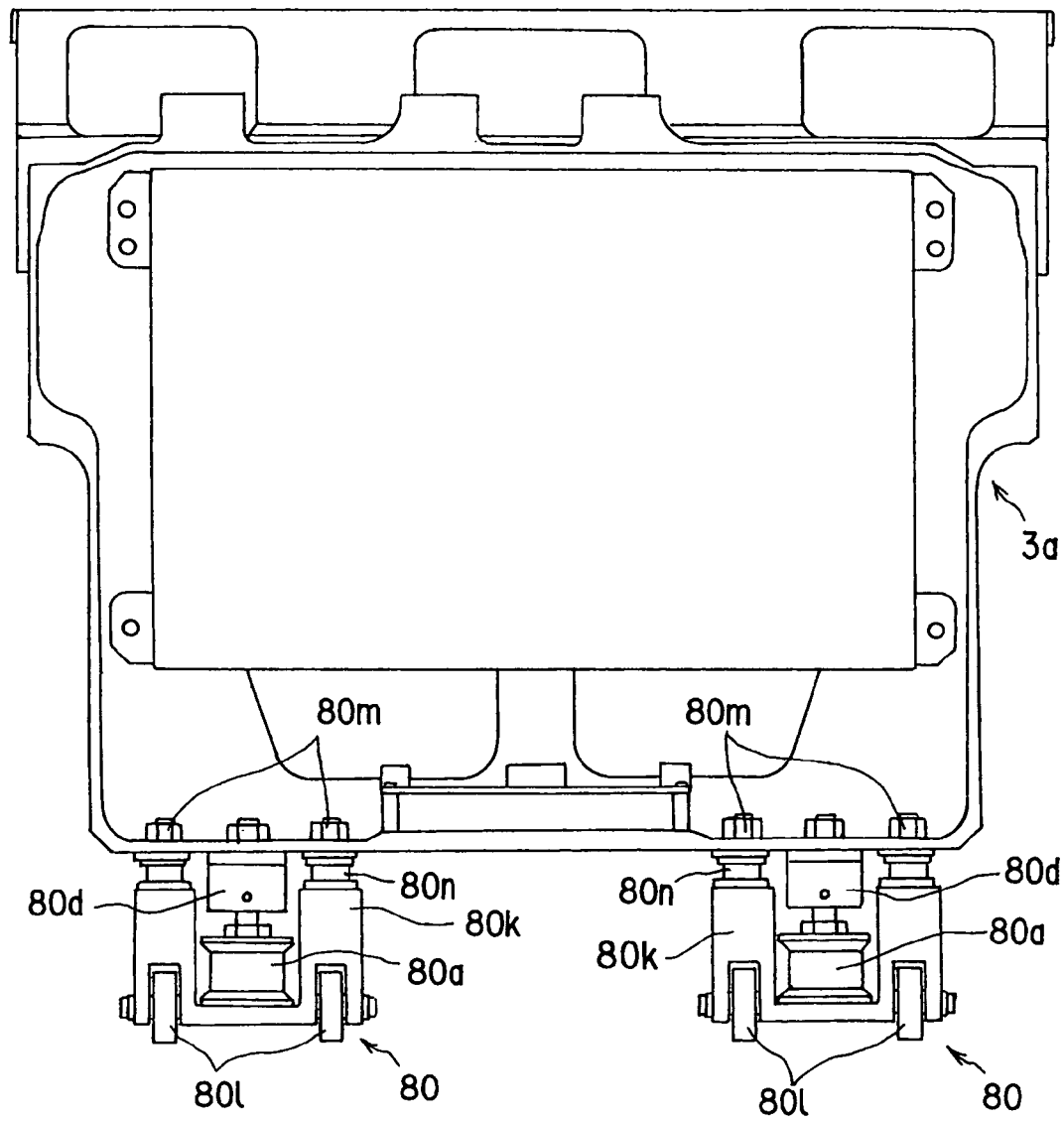
FIG. 17 is a front view of a body frame similar to FIG. 10, which shows a legged mobile robot according to a third embodiment of this invention.
Figure 18:
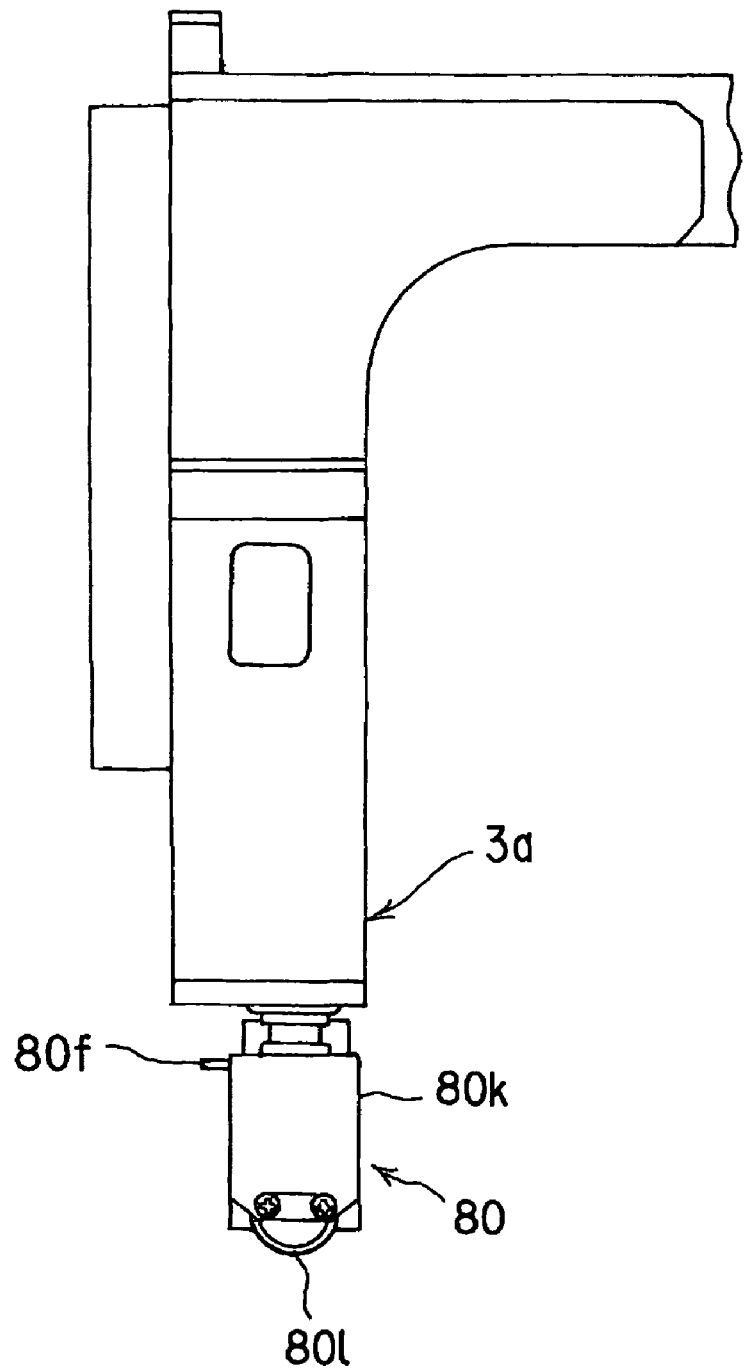
FIG. 18 is a side view of the body frame shown in FIG. 17.

FIGS. 17 and 18 are a front view and a side view of the body frame 3a similar to FIGS. 10 and 11, which show a legged mobile robot according to a third embodiment of this invention.

Although in the third embodiment, similarly to in the first embodiment, two seating aids 80 are attached to the lower end of the body frame 3a as spaced apart from each other, the shape of the seating aids 80 is modified. That is, the seating aid 80 is equipped with a frame 80k made of a metal material or the like to have a U-shape as viewed from the front and two rollers (rotating members) 80l similarly made of metal or the like are rotatably attached to the frame 80k. At its middle region, the frame 80k is fastened to the lower end of the body frame 3a via the member 80a and load cell 80d mentioned regarding the first embodiment, while holes are formed in the opposite sides thereof and rods 80n fastened to the lower end of the body frame 3a by nuts 80m inward thereof are slidably inserted into the holes.

In the third embodiment, the seating aids 80 are structured so that they can move relative to the seating surface 82a of the seat 82 on a total of four rollers 80l, and when an impact is received in the course of sitting, the members 80a contract so that the impact is absorbed by sliding of the frames 80k relative to the rods. Thus in the third embodiment, as in the second embodiment, the seating aids 80 are constituted as rotating members made of an elastic material.

Note that in the remaining aspects the configuration and effects are no different from those of the first embodiment.

Since the robot 1 according to the third embodiment is configured in the foregoing manner, it can provide the same effects as explained regarding the first embodiment.

In addition, since, similarly to in the second embodiment, the seating aid 80 is constituted of rotating members fabricated from an elastic material, impact at the time of sitting can be absorbed and the center of gravity of the robot 1 is made still easier to move forward, whereby the robot 1 can be enabled to keep a still more stable posture from before to after sitting down. Further, seating in a stable posture is possible irrespective of the posture of the body 3, and even if the seat 82 has some amount of inclination, its effect is not felt and a stable posture can be maintained from before to after sitting down.

Fourth Embodiment

Figure 19:
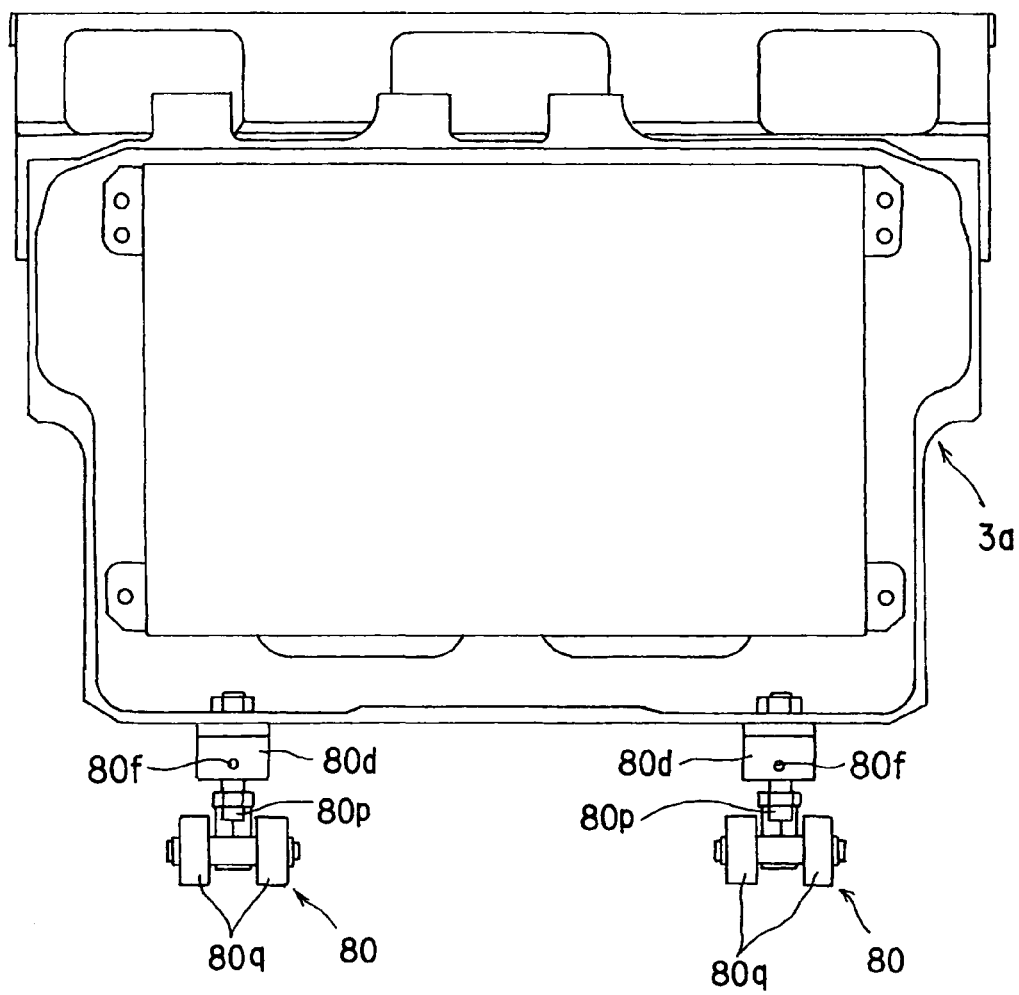
FIG. 19 is a front view of a body frame similar to FIG. 10, which shows a legged mobile robot according to a fourth embodiment of this invention.
Figure 20:
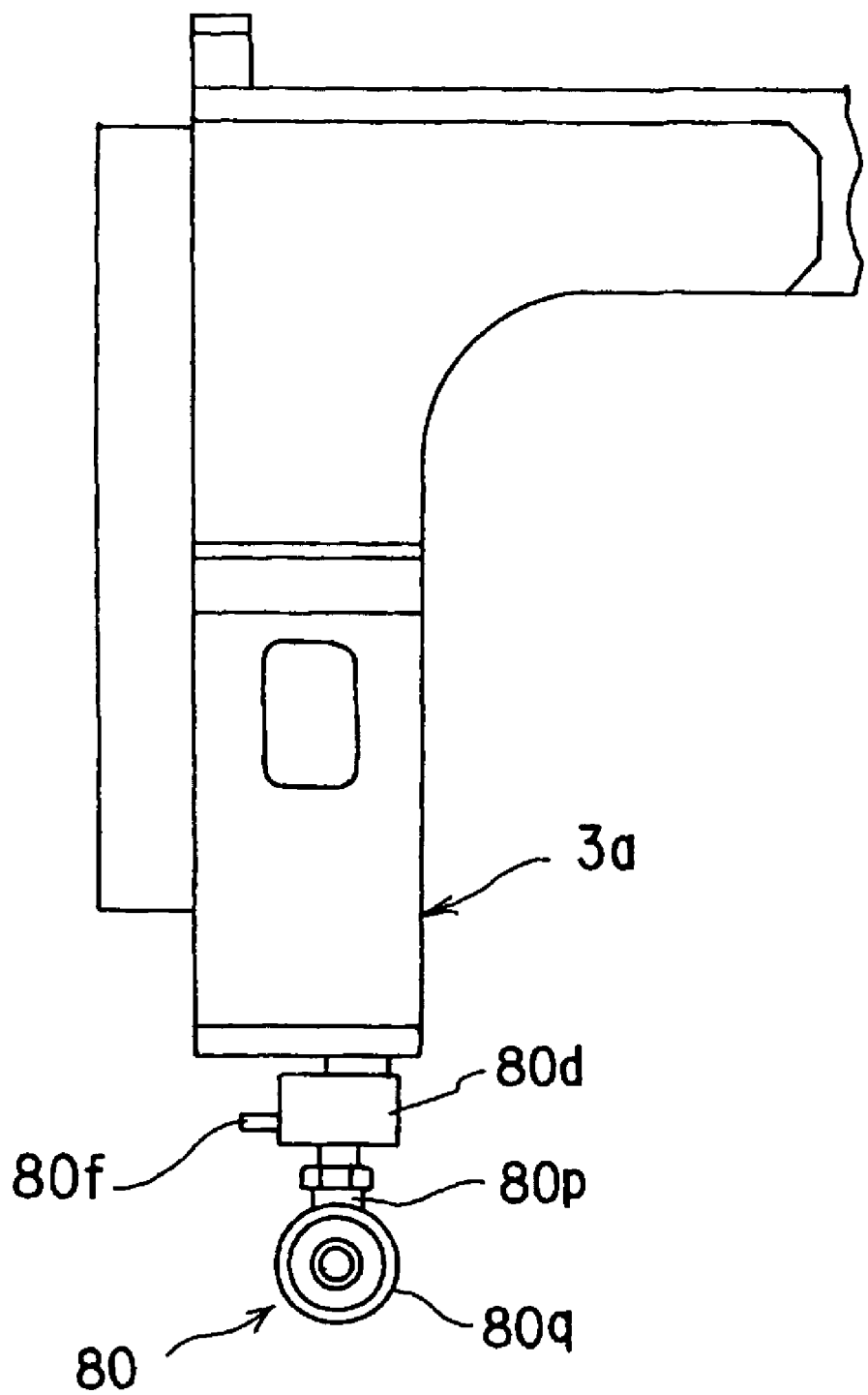
FIG. 20 is a side view of the body frame shown in FIG. 19.

FIGS. 19 and 20 are a front view and a side view of the body frame 3a similar to FIGS. 10 and 11, which show a legged mobile robot according to a fourth embodiment of this invention.

Although in the fourth embodiment, similarly to in the first embodiment, two seating aids 80 are attached to the lower end of the body frame 3a as spaced apart from each other, the shape of the seating aids 80 is modified. That is, the seating aid 80 is equipped with a post 80p made of metal or the like and two rollers (rotating members) 80q made of an elastic material that are rotatably attached to the post 80p. The post 80p is fastened to the lower end of the body frame 3a via the load cell 80d.

Also in the fourth embodiment, the seating aids 80 are structured so that they can displace or move relative to the seating surface 82a of the seat 82 on a total of four rollers 80q, and when an impact is received in the course of sitting, the rollers 80q contract to absorb the impact. Thus in the fourth embodiment, as in the second embodiment, the seating aids 80 are constituted as rotating members made of an elastic material.

Note that in the remaining aspects the configuration and effects are no different from those of the first embodiment.

Since the robot 1 according to the fourth embodiment is configured in the foregoing manner, it can achieve the same effects as explained regarding the second embodiment and third embodiment and, moreover, is simpler in structure than the third embodiment.

Fifth Embodiment

Figure 21:
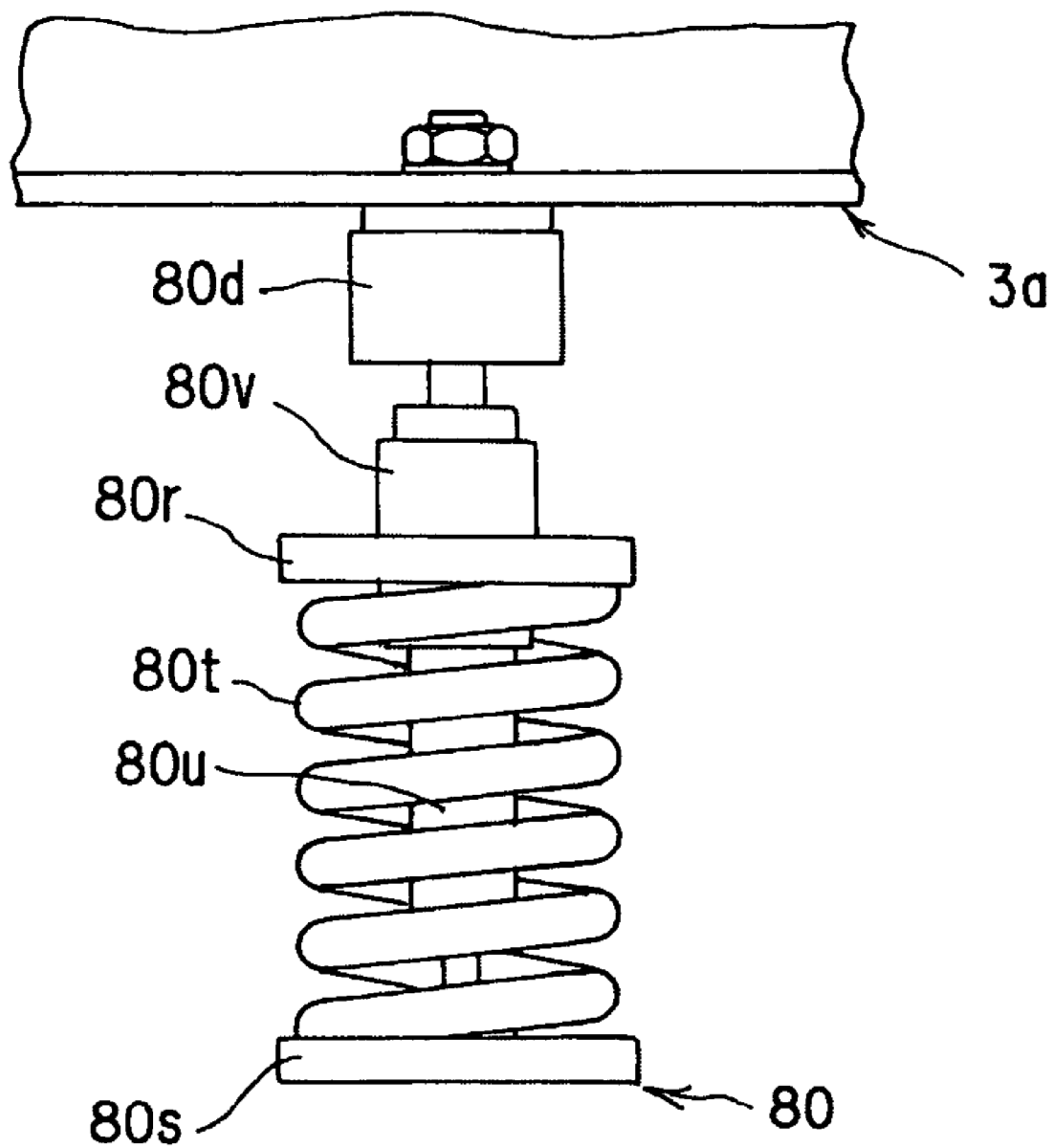
FIG. 21 is a front view of a seating aid, showing a legged mobile robot according to a fifth embodiment of this invention.
Figure 22:
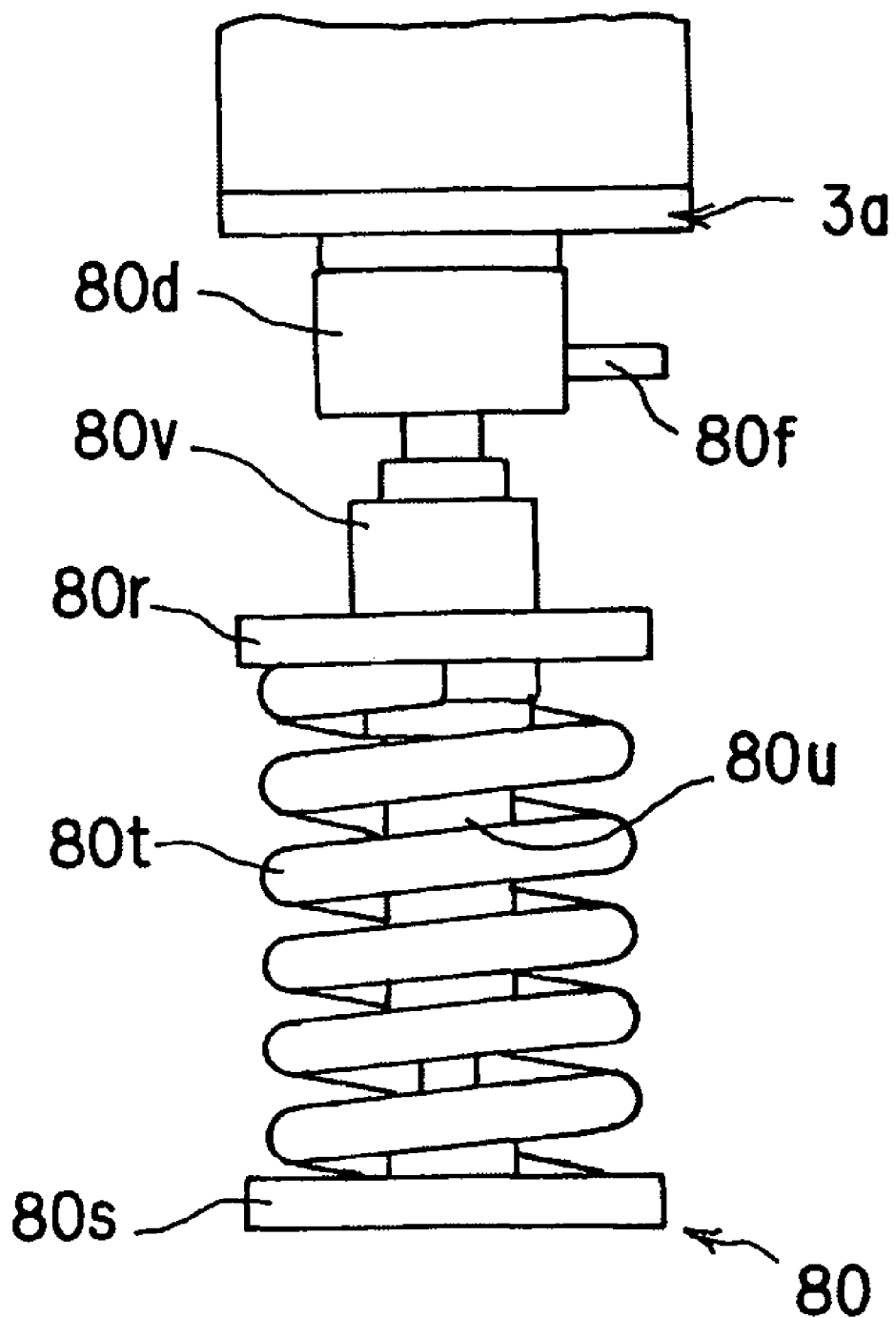
FIG. 22 is a side view of the seating aid shown in FIG. 21.

FIG. 21 is a front view of a seating aid 80, showing a legged mobile robot according to a fifth embodiment of this invention, and FIG. 22 is a side view thereof.

In the fifth embodiment, the seating aid 80 is equipped with two vertically spaced plates 80r, 80s made of metal, a coil spring 80t elastically fitted between the plates 80r, 80s, a damper 80u constituted of a hydraulic cylinder connecting the plates 80r, 80s, and a fitting 80v that attaches these to the lower end of the body frame 3a via the load cell 80d. Of the plates 80r, 80s, the lower plate 80s, which comes in contact with the seating surface 82a of the seat 82, is subjected to fluororesin-system coating or other such friction-reducing treatment so as to lower its coefficient of friction to facilitate movement on the seating surface 82a. Note that although omitted in the drawings, also in the fifth embodiment, as in the earlier embodiments, two seating aids 80 are attached to the lower end of the body frame 3a as spaced apart from each other.

In the fifth embodiment, the seating aids 80 are configured to be displaceable on the seating surface 82a, and when an impact is received in the course of sitting, the coil springs 80t contract to absorb the impact. No vibration occurs at this time, even when seating of the robot 1 is being controlled based on the outputs of the load cells 80d, because the dampers 80u operate to attenuate vibration by impact absorption.

Note that in the remaining aspects the configuration and effects are no different from those of the first embodiment.

Since the robot 1 according to the fifth embodiment is configured in the foregoing manner, it can provide the same effects as explained regarding the first embodiment.

Sixth Embodiment

Figure 23:
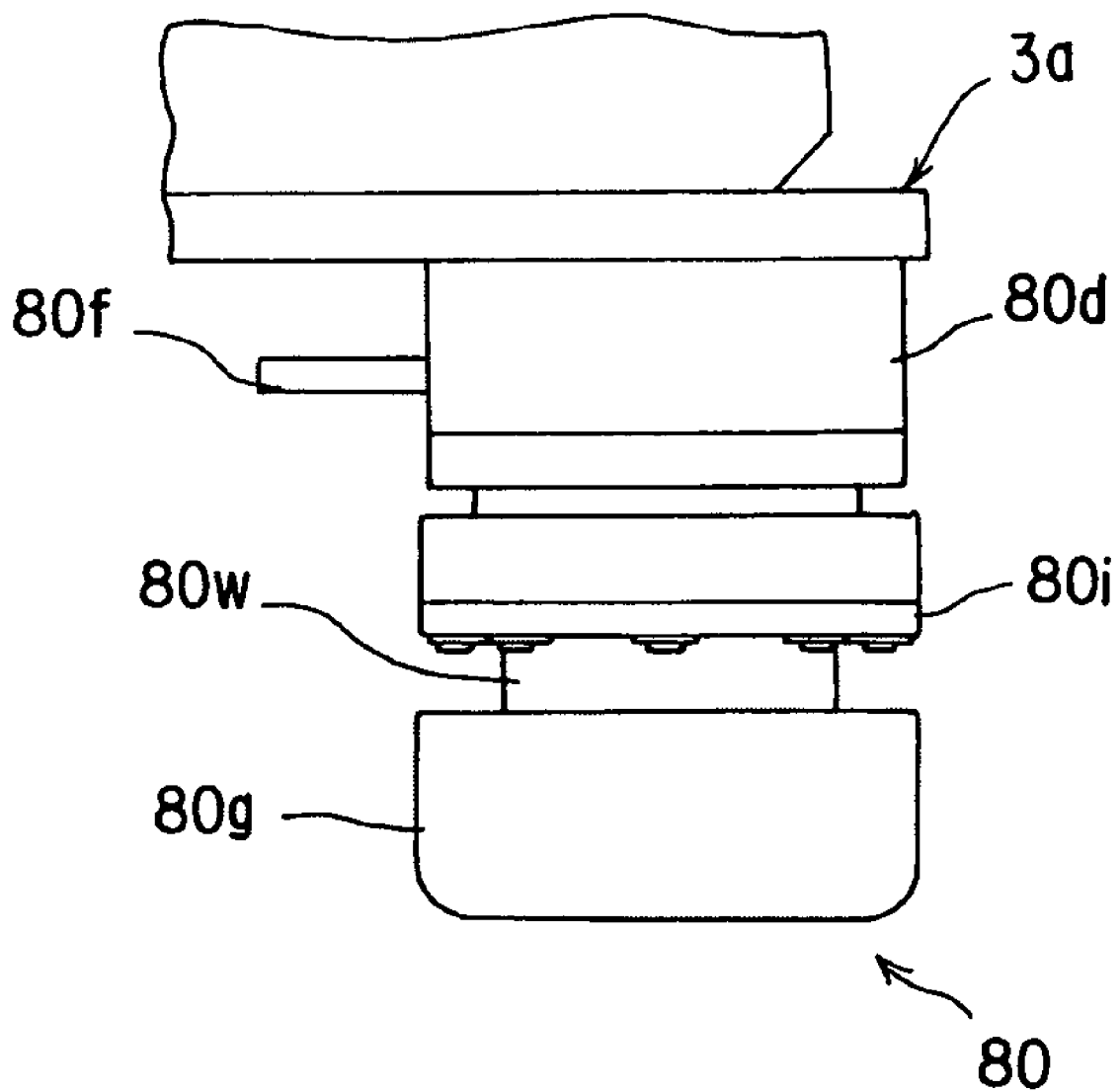
FIG. 23 is a front view of a seating aid, showing a legged mobile robot according to a sixth embodiment of this invention.
Figure 24:
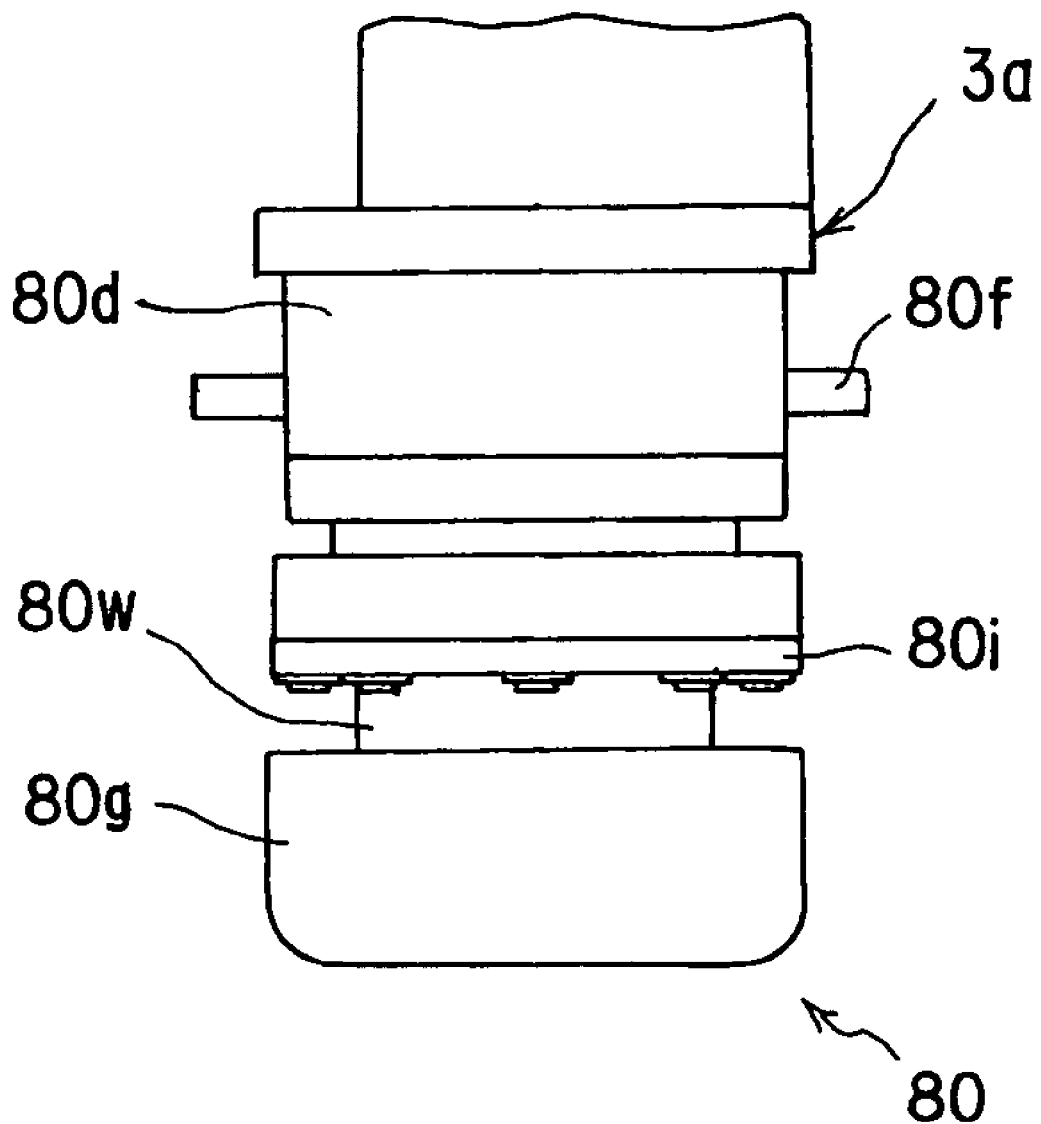
FIG. 24 is a side view of the seating aid shown in FIG. 23.

FIGS. 23 and 24 are a front view and a side view of a seating aid 80 similar to FIGS. 21 and 22, which show a legged mobile robot according to a sixth embodiment of this invention.

The sixth embodiment is a modification on the second embodiment, in which the member 80g made of metal or the like is fastened by the fitting 80i via an elastic member 80w of vibration proof rubber or the like to the lower end of the body frame 3a via the load cell 80d. The member 80g is subjected to fluororesin-system coating or other such friction-reducing treatment. Note that although omitted in the drawings, also in the sixth embodiment, as in the earlier embodiments, two seating aids 80 are attached to the lower end of the body frame 3a as spaced apart from each other.

In the sixth embodiment, the seating aids 80 are structured so that they can move on the seating surface 82a, and when an impact is received in the course of sitting, the elastic members 80w contract to absorb the impact.

Note that in the remaining aspects the configuration and effects are no different from those of the first embodiment.

As mentioned above, in the first to sixth embodiments, in a legged mobile robot 1 having at least a body 3 and a leg (leg linkage) 2 connected to the body 3 through a joint (hip joints 10R(L), etc.) and attached with a foot 22R(L) at its distal end, to be movable on a surface of floor by driving the leg 2 to bring the foot 22R(L) in contact with the floor surface, it is configured such that a seating aid 80 is provided at least one of the body 3 and the leg, more specifically at a body frame 3a so as to enable to sit on a seat 82; and the seating aid 80 is provided at a location that is rearward of a center of gravity of the robot when the robot 1 is seated.

Further, in a legged mobile robot 1 having at least a body 3 and a leg (leg linkage) 2 connected to the body through a joint (hip joints 10R(L), etc.) and attached with a foot 22R(L) at its distal end, to be movable on a surface of floor by driving the leg 2 to bring the foot in contact with the floor surface, it is configured such that a seating aid 80 is provided at least one of the body 3 and the leg, more specifically at a body frame 3a so as to enable to sit on a seat 82; and the seating aid 80 is made displaceable relative to the seat 82, more specifically that the body (upper body) is made displaceable (moveable back and forth) relative to the seat during sitting or during standing from the seated state.

Further, in a legged mobile robot 1 having at least a body 3 and a leg (leg linkage) 2 connected to the body 3 through a joint (hip joints 10R(L), etc) and attached with a foot 22R(L) at its distal end, to be movable on a surface of floor by driving the leg 2 to bring the foot in contact with the floor surface, it is configured such that a seating aid 80 is provided at least one of the body 3 and the leg 2, more specifically at a body frame 3a so as to enable to sit on a seat 82; and frictional force of the seating aid 80 relative to the seat 82 is made smaller than that of a ground contact surface of the foot (elastic member 22a) relative to the floor surface F, more specifically, the frictional force of a material that constitutes a portion (member 80a, 80g, 80s) of the seating aid that contacts the seat, is made smaller than that of a material that constitutes the ground contact surface of the foot (elastic member 22a).

Further, in a legged mobile robot having at least a body 3, a leg (leg linkage) 2 swingably connected to the body 3 through a hip joint (10R(L), etc) and attached with a foot 22R(L) at its distal end, and an arm (arm linkage) 5 swingably connected to the body through a shoulder joint (30R(L), etc.) and attached with a hand 40R(L) at its distal end, to work in a workspace by driving at least the arm linkage, it is configured such that: a seating aid 80 is provided at least one of the body and the leg, more specifically at a body frame 3a so as to enable to sit on a seat 82 to work on objects in the workspace; a height to the shoulder joint from a ground contact surface of the foot (elastic member 22a) when the robot is seated, is defined within a range determined based on an averaged value Havg obtained by averaging heights of the objects from a surface of floor F and deviations δ thereof; and the seating aid is provided at a location predetermined distance below the shoulder joint in a gravity direction.

Further, it is configured such that the leg has a thigh link 24R(L) and a shank link 26R(L) connected by a knee joint 16R(L), and the seating aid 80 is provided at a location within a range of $H \pm \{(1/3) \cdot H\}$ from the ground contact surface of the foot (elastic member 22a), when the robot 1 is seated, if a distance from the ground contact surface of the foot to the knee joint is defined as H.

Further, it is configured such that a portion (member 80a, 80q) of the seating aid 80 that contacts the seat 82 comprises an elastic member.

Further, it is configured such that a portion (member 80h, 80l, 80q) of the seating aid 80 that contacts the seat 82 comprises a rotating member.

Further, it is configured such that a portion (member 80q) of the seating aid 80 that contacts the seat 82 comprises a rotating member fabricated from an elastic material.

Further, it is configured such that the seating aid 80 is provided with a terminal 84 for charging a battery that powers onboard equipment of the robot.

Note that although the seating aids 80 are provided on the body 3 (body frame 3a) in the foregoing, it is also acceptable to provide them on the legs 2.

Further, the number, material, shape and the like of the seating aids 80 is not limited to those specified.

INDUSTRIAL APPLICABILITY

According to this invention, in a legged mobile robot, since seating aids are provided on the body to enable sitting on a seat, the space occupied can be decreased to reduce space during storage and transport and also enhance safety in the course of transport. In addition, maintenance work is simplified because immobilization in the seated condition is possible. Moreover, the range of tasks is expanded to enable deskwork and the like. Further, the seating aids are provided at locations that, when the robot is seated, is rearward of the center of gravity when the robot is seated, so that the moment acting on the robot about the center of gravity during seating does not operate to tilt the robot rearward and, therefore, the robot can be enabled to keep a stable posture from before to after sitting down.

The invention claimed is:

1. A legged mobile robot comprising:
   a body;
   a leg linkage connected to the body through a joint and attached with a foot at its distal end, wherein the robot is movable on a surface of a floor by driving the leg linkage to bring the foot in contact with a floor surface; and
   a seating aid comprising a cylindrical member attached to the robot configured to support the at least one of the body and the leg linkage so as to enable the robot to sit on a seat, wherein
   the seating aid is made displaceable relative to the seat.

2. A legged mobile robot according to claim 1, wherein the seating aid is provided at a location that is rearward of a center of gravity of the robot when the robot is seated.

3. A legged mobile robot according to claim 1, wherein the seating aid is provided with a terminal for charging a battery that powers onboard equipment of the robot.

4. A legged mobile robot, comprising:
   a body;
   a leg linkage swingably connected to the body through a hip joint and attached with a foot at its distal end, and an arm linkage swingably connected to the body through a shoulder joint and attached with a hand at its distal end, to work in a workspace by driving the arm linkage; and
   a seating aid comprising a cylindrical member attached to the robot configured to support the at least one of the body and the leg linkage so as to enable the robot to sit on a seat to work on objects in the workspace, wherein
   a height to the shoulder joint from a ground contact surface of the foot when the robot is seated is defined within a range determined based on an averaged value obtained by averaging heights of the objects from a surface of floor and deviations thereof, and wherein
   the seating aid is located at a predetermined distance below the shoulder joint in a gravity direction.

5. A legged mobile robot according to claim 4, wherein the leg linkage has a thigh link and a shank link connected by a knee joint, and the seating aid is provided at a location within a range of $H\pm\{(\frac{1}{3})\cdot H\}$ from the ground contact surface of the foot, when the robot is seated, if a distance from the ground contact surface of the foot to the knee joint is defined as H.

6. A legged mobile robot according to claim 4, wherein the seating aid is provided with a terminal for charging a battery that powers onboard equipment of the robot.

7. A legged mobile robot, comprising:
   a body;
   a leg linkage connected to the body through a joint and attached with a foot at its distal end, wherein the robot is movable on a surface of a floor by driving the leg linkage to bring the foot in contact with a floor surface; and
   a seating aid configured to support the at least one of the body and the leg linkage so as to enable the robot to sit on a seat, wherein
   a portion of the seating aid that contacts the seat comprises a rotating member to enable the seating aid to be displaceable relative to the seat.

8. A legged mobile robot according to claim 7, wherein the seating aid is provided with a terminal for charging a battery that powers onboard equipment of the robot.

9. A legged mobile robot, comprising:
   a body; and
   a leg linkage connected to the body through a joint and attached with a foot at its distal end, wherein the robot is movable on a surface of a floor by driving the leg linkage to bring the foot in contact with a floor surface; and
   a seating aid configured to support the at least one of the body and the leg linkage so as to enable the robot to sit on a seat, wherein
   a portion of the seating aid that contacts the seat comprises a rotating member fabricated from an elastic material to enable the seating aid to be displaceable relative to the seat.

10. A legged mobile robot according to claim 9, wherein the seating aid is provided with a terminal for charging a battery that powers onboard equipment of the robot.

* * * * *